(12) United States Patent
Ogino

(10) Patent No.: US 12,086,485 B2
(45) Date of Patent: Sep. 10, 2024

(54) DISPLAY DEVICE, IMAGE PROCESSING APPARATUS, AND DISPLAY SCREEN DISPLAY METHOD FOR CONTROLLING SCREEN DISPLAY OF DEVICE SETTING ITEM

(71) Applicant: SHARP KABUSHIKI KAISHA, Sakai (JP)

(72) Inventor: Kumiko Ogino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/942,071

(22) Filed: Sep. 9, 2022

(65) Prior Publication Data
US 2023/0086919 A1 Mar. 23, 2023

(30) Foreign Application Priority Data
Sep. 17, 2021 (JP) .................................. 2021-152186

(51) Int. Cl.
*G06F 3/12* (2006.01)
*H04N 1/00* (2006.01)

(52) U.S. Cl.
CPC .......... *G06F 3/1258* (2013.01); *G06F 3/1205* (2013.01); *H04N 1/00381* (2013.01); *H04N 1/00411* (2013.01)

(58) Field of Classification Search
None
See application file for complete search history.

(56) References Cited

U.S. PATENT DOCUMENTS

| | | | |
|---|---|---|---|
| 2015/0043020 A1* | 2/2015 | Hamada | H04N 1/00413 358/1.13 |
| 2016/0360051 A1* | 12/2016 | Santillan | H04N 1/00411 |
| 2018/0246636 A1* | 8/2018 | Horiike | H04N 1/00461 |
| 2019/0004680 A1* | 1/2019 | Hirasawa | G06F 3/04847 |
| 2020/0151790 A1* | 5/2020 | Oh | G06Q 20/4014 |
| 2022/0166888 A1* | 5/2022 | Okuno | H04N 1/00209 |
| 2023/0035709 A1* | 2/2023 | Yu | G06F 3/04883 |
| 2023/0042939 A1* | 2/2023 | Lee | G09G 5/373 |
| 2023/0045834 A1* | 2/2023 | Hong | G06F 3/04845 |
| 2023/0074701 A1* | 3/2023 | Kim | G09G 3/035 |

FOREIGN PATENT DOCUMENTS

JP 2017-004042 A 1/2017

\* cited by examiner

*Primary Examiner* — Akwasi M Sarpong
*Assistant Examiner* — Pawan Dhingra
(74) *Attorney, Agent, or Firm* — ScienBiziP, P.C.

(57) ABSTRACT

A display device includes a display capable of displaying a first display screen, a second display screen different from the first display screen, and a device setting item displayed together with the first display screen or the second display screen, and a controller that controls a screen display on the display, wherein the controller determines a display mode of the device setting item on the second display screen in accordance with a display setting of the device setting item on the first display screen.

12 Claims, 15 Drawing Sheets

FIG. 3A

| DISPLAY SCREEN MANAGEMENT TABLE | | | |
|---|---|---|---|
| DISPLAY SCREEN | DISPLAY SCREEN EXAMPLE | DEVICE SETTING ITEM DISPLAY FLAG (FIRST DISPLAY SETTING) | DEVICE SETTING ITEM DISPLAY FLAG (SECOND DISPLAY SETTING) |
| FIRST DISPLAY SCREEN | HOME SCREEN | Yes | No |
| SECOND DISPLAY SCREEN | SYSTEM INFORMATION SCREEN<br>COPY SETTING SCREEN<br>SIMPLE COPY SETTING SCREEN<br>FAX SETTING SCREEN<br>SIMPLE FAX SETTING SCREEN<br>SIMPLE SCAN SETTING SCREEN<br>E-MAIL SETTING SCREEN<br>FTP SETTING SCREEN<br>DESKTOP SETTING SCREEN<br>SHARED FOLDER SENDING SETTING SCREEN<br>INTERNET FAX SETTING SCREEN<br>DATA INPUT SETTING SCREEN<br>SCAN SAVE SETTING SCREEN<br>: | No | Yes (SIMPLE TYPE/DISPLAY POSITION UNFIXED) |

FIG. 3B

| DISPLAY SCREEN MANAGEMENT TABLE | | | |
|---|---|---|---|
| DISPLAY SCREEN | DEVICE SETTING ITEM DISPLAY ICON (SECOND DISPLAY SCREEN) | ICON SELECTION | DEVICE SETTING ITEM DISPLAY FLAG |
| FIRST DISPLAY SETTING | Yes | Yes | Yes (SIMPLE TYPE/DISPLAY POSITION UNFIXED) |
| | | No | No |
| SECOND DISPLAY SETTING | No | | |

FIG. 3C

| DISPLAY SCREEN MANAGEMENT TABLE | | | |
|---|---|---|---|
| DISPLAY SCREEN | DEVICE SETTING ITEM DISPLAY SWIPE OPERATION | SWIPE | DEVICE SETTING ITEM DISPLAY FLAG |
| FIRST DISPLAY SETTING | Yes | Yes | Yes (SIMPLE TYPE/DISPLAY POSITION UNFIXED) |
| | | No | No |
| SECOND DISPLAY SETTING | Yes | Yes | Yes (SIMPLE TYPE/DISPLAY POSITION UNFIXED) |
| | | No | No |

FIG. 3D

| DISPLAY SCREEN MANAGEMENT TABLE | | | |
|---|---|---|---|
| DISPLAY SCREEN | DEVICE SETTING ITEM DISPLAY ICON SELECTION OPERATION | ICON SELECTION | DEVICE SETTING ITEM DISPLAY FLAG |
| FIRST DISPLAY SETTING | Yes | Yes | Yes (SIMPLE TYPE/DISPLAY POSITION UNFIXED) |
| | | No | No |
| SECOND DISPLAY SETTING | Yes | Yes | Yes (SIMPLE TYPE/DISPLAY POSITION UNFIXED) |
| | | No | No |

DISPLAY DEVICE, IMAGE PROCESSING APPARATUS, AND DISPLAY SCREEN DISPLAY METHOD FOR CONTROLLING SCREEN DISPLAY OF DEVICE SETTING ITEM

BACKGROUND OF THE INVENTION

Field of the Invention

The present disclosure relates to a display device and the like.

Description of the Background Art

Some image processing apparatus such as multifunction peripherals collectively displays, on a single display screen, a function menu area where function menu buttons for image processing, such as copying, faxing, and scanning, are provided and a device setting area where setting-related buttons for language setting, operation guide, maintenance, and the like, are provided so as to enhance the user's operability.

Such a screen is called a home screen and is displayed, for example, at the time of start-up of the device, the recovery from a sleep mode, or the recovery of the screen after the execution of a function. Function menu buttons and setting-related buttons forming the home screen serve as an interface for hierarchically displaying a function setting screen, a device setting screen, a system information screen, and the like, represented by these buttons.

The display layout of the home screen may be set and changed via system settings. Here, when a selected display layout displays the frequently used function menu buttons with priority, it is difficult to ensure the screen area for displaying the device setting area, and it is thus sometimes difficult to display the setting-related buttons.

For example, there is a disclosure that, in order to ensure a normal menu icon display area as large as possible in the menu screen, no shortcut menu icon display area is provided, and a shortcut menu screen is invoked and displayed by a swipe operation, or the like.

However, the conventional techniques including the above technique do not take into account the display of a device setting item such as a setting-related button on other display screens (e.g., copy setting screen) displayed via the home screen by selection of the function menu button, etc.

Therefore, it is difficult for the user to perform operations for device settings, such as language setting change or operation confirmation, in the middle of function settings via other display screens, which is not always convenient.

The present disclosure has an object to provide a display device and the like that, based on the display setting of a device setting item on the home screen, determines the display mode of the device setting item on other display screens and thus may improve user convenience.

SUMMARY OF THE INVENTION

In order to solve the above problem, a display device according to the present disclosure includes a display capable of displaying a first display screen, a second display screen different from the first display screen, and a device setting item displayed together with the first display screen or the second display screen, and a controller that controls a screen display on the display, wherein the controller determines a display mode of the device setting item on the second display screen in accordance with a display setting of the device setting item on the first display screen.

An image processing apparatus according to the present disclosure includes the display device and an image processor that performs image processing based on a display content displayed on the first display screen or the second display screen.

A display screen display method according to the present disclosure includes displaying a first display screen, a second display screen different from the first display screen, and a device setting item to be displayed together with the first display screen or the second display screen, and controlling a screen display at the displaying, wherein the controlling determines a display mode of the device setting item on the second display screen in accordance with a display setting of the device setting item on the first display screen.

According to the present disclosure, based on the display setting of the device setting item on the home screen, the display mode of the device setting item on other display screens is determined so that it is possible to provide the display device and the like that may improve user convenience.

BRIEF DESCRIPTION OF THE DRAWINGS

FIGS. 3A to 3D are tables illustrating display screen management tables.

DESCRIPTION OF THE PREFERRED EMBODIMENTS

Embodiments of the present disclosure will be described below with reference to the drawings. In the present disclosure, a multifunction peripheral capable of executing, in a single housing, jobs regarding for example copying, faxing, and image sending will be described as one mode of a display device or an image processing apparatus in which the display device is mounted. The embodiments below are examples for describing the present disclosure, and the technical scope of the description in claims is not limited to the description below.

In a mode described according to the present disclosure, a display screen example of a first display screen is a home screen. A second display screen is a display screen that is output by selection of a function menu button, or the like, provided on the home screen when the first display screen is the home screen. Examples of the second display screen may include display screens belonging to the next layer below the home screen, such as a system information screen displayed by pressing of a system information button provided on the home screen and a simple copy setting screen output by pressing of a simple copy button, or the like. The examples of the second display screen have multiple display modes as described below and, in the description of the present disclosure, are simply referred to as the second display screen, and a display screen example will be described each time.

According to the present disclosure, setting-related buttons for device settings, such as brightness control, volume, language setting, settings, enlarge character mode, and total paper count, and notifiers that notify the user of setting-related information such as consumables information and device status through charts, character strings, symbols, and the like, are collectively referred to as device setting items.

The device setting item is displayable together with the first display screen or the second display screen. In this case, the device setting item is displayable alone or the device setting items is displayable in combination in an occupation area (device setting area) that occupies a portion of the display screen. According to the present disclosure, the occupation area whose display position is fixed on the display screen is, in particular, referred to as a fixed area.

1 First Embodiment

A first embodiment is an embodiment in which a display mode of the device setting item on the second display screen is determined in accordance with the display setting of the device setting item on the home screen. The first embodiment is an embodiment in which the occupation area for displaying the device setting item is a fixed area.

1.1 Functional Configuration

Figure 1:
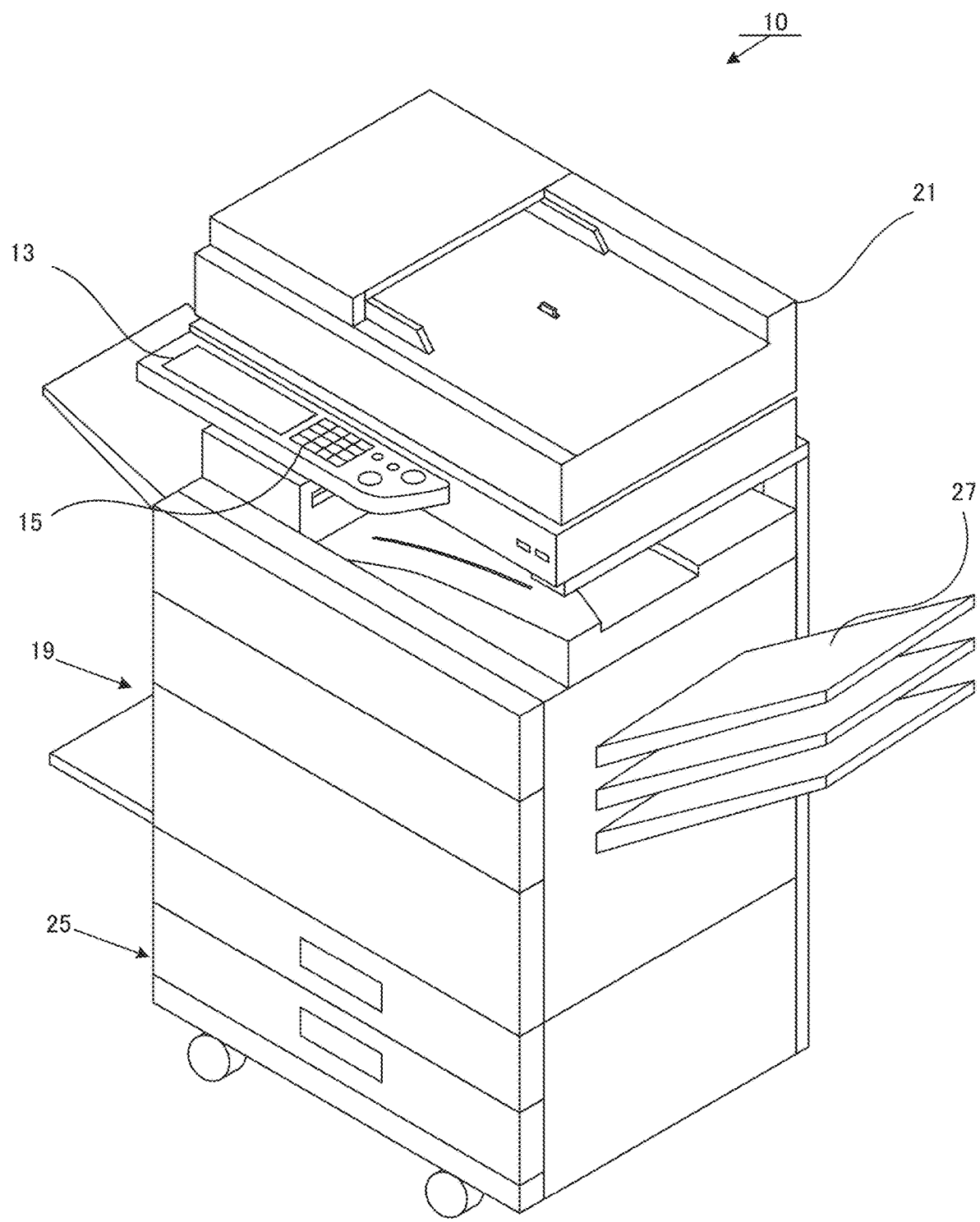
FIG. 1 is an external perspective view of a multifunction peripheral according to a first embodiment.
Figure 2:
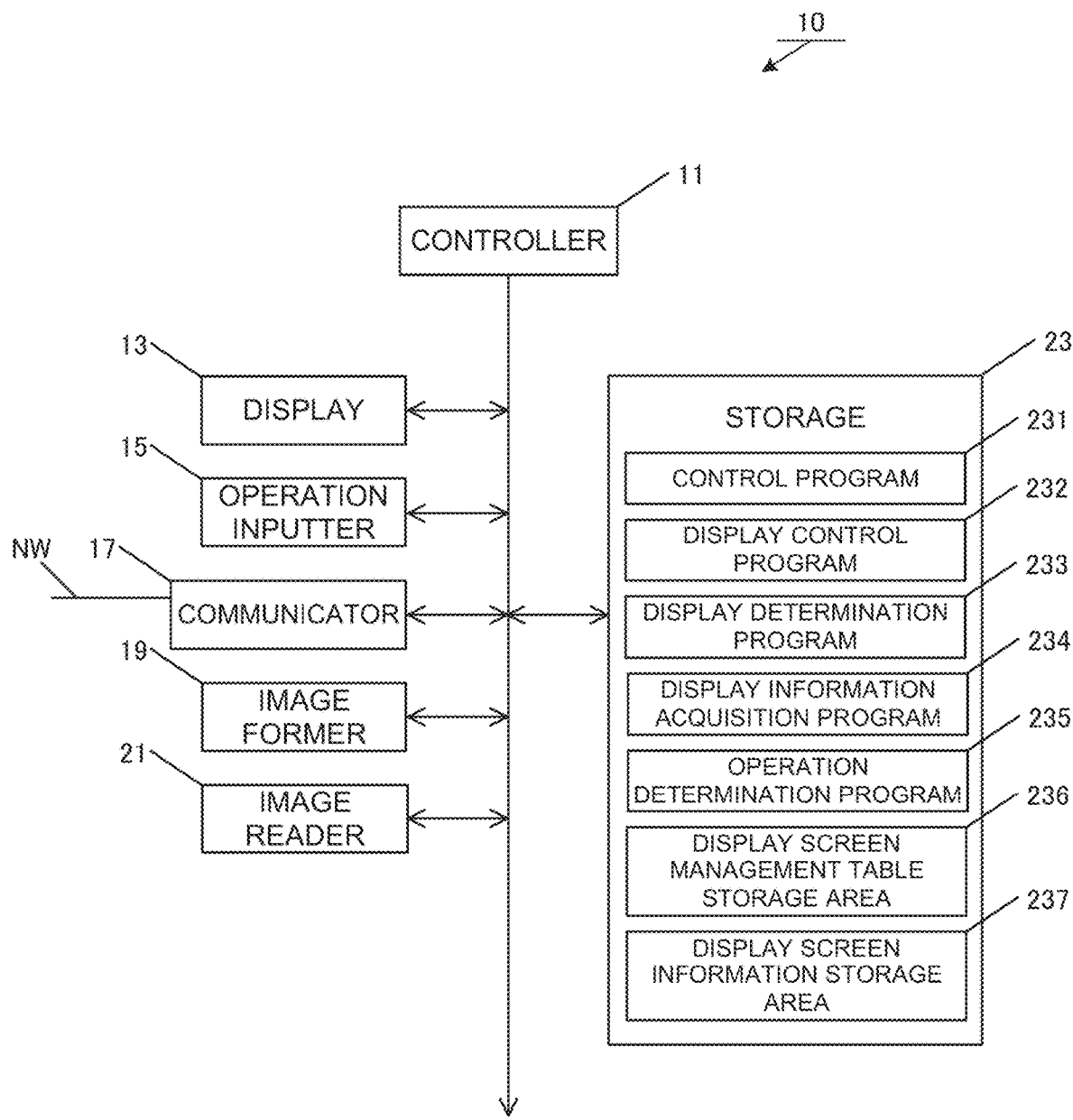
FIG. 2 is a functional configuration diagram of the multifunction peripheral according to the first embodiment.

A functional configuration of a multifunction peripheral 10 according to the first embodiment will be described with reference to FIGS. 1 and 2. FIG. 1 is an external perspective view schematically illustrating an overall configuration of the multifunction peripheral 10. FIG. 2 is a functional configuration diagram of the multifunction peripheral 10. The multifunction peripheral 10 includes a controller 11, a display 13, an operation inputter 15, a communicator 17, an image former 19 and an image reader 21 as an image processor, and a storage 23.

The controller 11 controls the overall multifunction peripheral 10. The controller 11 includes, for example, one or more arithmetic devices (e.g., central processing units (CPUs)). The controller 11 reads and executes various programs stored in the storage 23 to perform its functions.

The display 13 presents various types of information to a user, or the like. The display 13 may include, for example, a liquid crystal display (LCD) or an organic electro-luminescence (EL) display.

The operation inputter 15 receives input of information by the user, or the like. The operation inputter 15 may include a hardware key (e.g., a numeric keypad), buttons, or the like. The operation inputter 15 may be configured as a touch panel that allows input via the display 13. In this case, examples of an input method of the touch panel may include typical methods such as a resistive method, an infrared method, an electromagnetic induction method, or a capacitive method.

The communicator includes either one or both of wired and wireless interfaces for performing communications with other devices via a network (NW) such as a local area network (LAN), a wide area network (WAN), the internet, a telephone line, or a fax line.

The image former 19 forms an image based on image data on paper as a recording medium. The image former 19 feeds paper from a paper feeder 25, forms the image based on the image data on the paper, and then ejects the paper to a paper discharge portion 27. The image former 19 may include, for example, a laser printer using an electrophotographic method. In this case, the image former 19 forms an image using toners supplied from toner cartridges (not illustrated) corresponding to toner colors (e.g., cyan, magenta, yellow, and black).

The image reader 21 scans and reads a document image to be read and thus generates the image data. The image reader 21 may be configured as a scanner device including an image sensor such as a charge coupled device (CCD) or a contact image sensor (CIS). The configuration of the image reader 21 is not limited as long as the image reader 21 is configured to read a reflected light image from the document image with an image sensor and thus generate the image data.

The storage 23 stores various types of data and various programs needed for an operation of the multifunction peripheral 10. The storage 23 may include a storage device such as a random access memory (RAM), a hard disk drive (HDD), a solid state drive (SSD), and a read only memory (ROM).

According to the first embodiment, the storage 23 stores a control program 231, a display control program 232, a display determination program 233, a display information acquisition program 234, an operation determination program 235 and ensures a display screen management table storage area 236 and a display screen information storage area 237.

The control program 231 is a program read by the controller 11 to perform processing based on each function, such as copying, faxing, and image sending. After reading the control program 231, the controller 11 controls the display 13, the operation inputter 15, the communicator 17, the image former 19, the image reader 21, and the like, to perform each function.

The display control program 232 is a program read by the controller 11 to control the display 13 and the operation inputter 15. After reading the display control program 232, the controller 11 controls the screen output of the display screen in the operation inputter 15 configured as a touch panel. After reading the display control program 232, the controller 11 uses the frame information for the screen configuration stored in the display screen information storage area 237, the setting values for job execution acquired by the display information acquisition program 234, the device information, and the like, to configure the home screen, the second display screen, and the device setting item and outputs them to the touch panel. In this case, the controller 11 ensures a portion of the display area of the home screen, the second display screen, or the like, as an occupation area and displays the device setting item in the occupation area.

The display determination program 233 is a program read by the controller 11 to determine the display mode of the device setting item on the second display screen in accordance with the display setting of the device setting item on the home screen. According to the present disclosure, "determining the display mode" refers to determining the display method or display format of the device setting item on the display screen and specifically may include the following modes.

(1) A method for displaying the device setting item so as to be distinguishable on the display screen
(2) A method for displaying the device setting item based on a selection result of a shortcut icon displayed on the display screen
(3) A method for displaying the device setting item based on a detection result of a gesture operation on the display screen
(4) A method for displaying the device setting item when an event related to the device setting item occurs
(5) A method for hiding the device setting item The above-described display methods (1) to (4) may each include (i) a display format for outputting the same item as the device setting item output in the fixed area (the display position is fixed or unfixed), (ii) a display format for output as a simple type obtained by simplifying the item output in the fixed area (the display position is fixed or unfixed), and (iii) a display format for outputting a specific device setting item (the display position is fixed or unfixed).

The display mode of the device setting item may be set via a display screen management table described below, system settings, etc.

The display information acquisition program 234 is a program read by the controller 11 to acquire various types of information to be displayed together with a frame image when the home screen, the second display screen, the device setting item, or the like, is displayed. The information acquired by the controller 11 after reading the display information acquisition program 234 is not particularly limited, but examples thereof may include the setting values for image processing for each function such as copying, faxing, or scanning on a job-by-job basis, information about the remaining amount of consumable material for image processing such as the remaining amount of toner, and information about the device status such as communication status for wireless communication, etc.

The operation determination program 235 is a program read by the controller 11 to detect a button selection or gesture operation by the user. After reading the operation determination program 235, the controller 11 performs a touch position detection function corresponding to each input method of the touch panel, such as resistive method, infrared method, electromagnetic induction method, or capacitive method, and determines the user operation based on the input information such as the touch position, touch trajectory, and touch pressure by the user's finger or the touch pen.

The display screen management table storage area 236 is a storage area that stores the display screen management table referred to by the controller 11 to determine the display mode of the device setting item on the second display screen in accordance with the display setting of the device setting item on the home screen.

Here, the display screen management table will be described with reference to FIGS. 3A to 3D. FIG. 3A is a table illustrating one mode of the data structure of the display screen management table according to the first embodiment.

The display screen management table in FIG. 3A is a table referred to by the controller 11 after reading the display determination program 233 to determine the display mode of the device setting item on the second display screen in accordance with the display setting of the device setting item on the home screen that is the first display screen.

In the display screen management table, when a display setting flag for the device setting item on the home screen is "Yes" (first display setting), a display setting flag for the device setting item on the second display screen is set to "No". Conversely, when the display setting flag for the device setting item on the home screen is "No" (second display setting), the display setting flag for the device setting item on the second display screen is set to "Yes (simple type/display position unfixed)".

Here, the simple type/display position unfixed defines the content of the device setting item displayed on the second display screen with respect to the device setting item displayed in the fixed area on the home screen. The simple type is a display format for output as a simple type obtained by simplifying the item that is output in the fixed area described above, and the display position unfixed defines that the display position of the occupation area displaying the device setting item is unfixed.

When the read display setting is the first display setting, the controller 11, which read the display determination program 233, makes the setting to display the device setting item on the home screen. Then, during the display setting determination for the second display screen, it is determined that the device setting item is to be hidden.

Conversely, when the read display setting is the second display setting, the controller 11, which read the display determination program 233, makes the hiding setting to hide the device setting item on the home screen. Then, during the display setting determination for the second display screen, it is determined that the device setting item is to be displayed. For example, based on the display screen management table, the controller 11 determines the mode (the display position on the second display screen is unfixed) for output as the simple type obtained by simplifying the device setting item output in the fixed area.

The display screen information storage area 237 is a storage area that stores screen frames forming each display screen, such as the home screen, the second display screen, and the fixed area, and various types of information acquired by the display information acquisition program 234.

1.2 Process Flow

Figure 4:
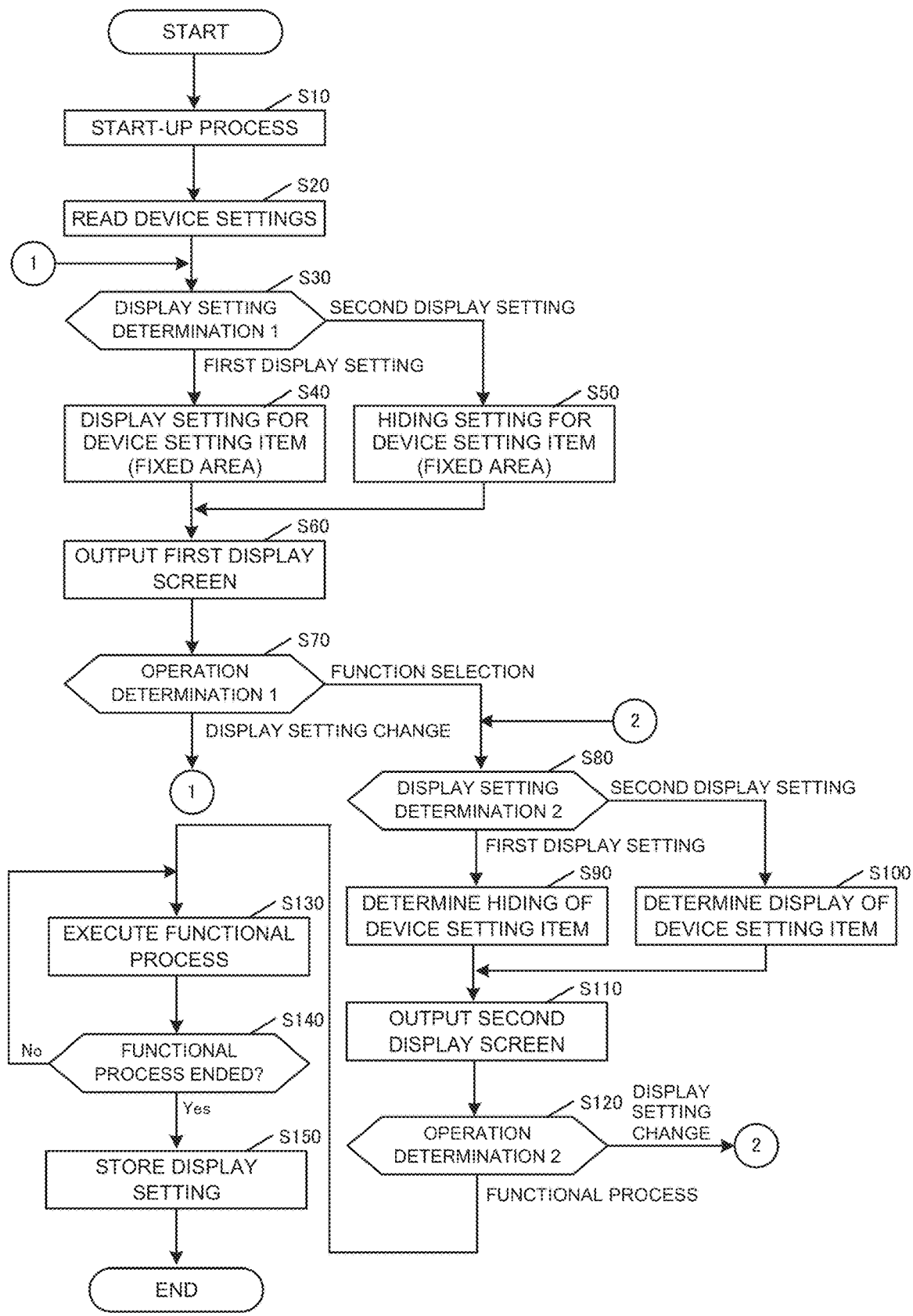
FIG. 4 is a flowchart illustrating a process flow according to the first embodiment.

Next, a process flow according to the first embodiment will be described using a flowchart in FIG. 4. This process is a process performed when the controller 11 reads the control program 231, the display control program 232, the display determination program 233, the display information acquisition program 234, the operation determination program 235, etc.

For example, at the time of turn-on of the device power, the recovery from the sleep mode, or the like, the controller 11 performs a start-up process (Step S10).

Then, the controller 11 reads the device settings and applies them to the device status (Step S20). At this time, the controller 11 reads the display setting and performs display setting determination 1 (Step S30).

When the first display setting is determined as a result of the display setting determination 1, the controller 11 makes the display setting for the device setting item (fixed area) as the display of the device setting item (Step S30; "first display setting"→Step S40). Conversely, when the second display setting is determined as a result of the display setting determination 1, the controller 11 makes the hiding setting for the device setting item (fixed area) (Step S30; "second display setting" →Step S50).

Based on the setting result at Step S40 or S50, the controller 11 outputs the home screen as the first display screen to the touch panel as the operation inputter 15 (Step S60). Specifically, when the display setting is made for the device setting item (Step S40), the controller 11 outputs the device setting item to be displayed in the fixed area together with the home screen. Here, as the screen configuration of the home screen, a screen area for the fixed area may be provided on a portion of the screen area of the home screen, or the fixed area may be displayed on the screen area of the home screen in a superimposed manner. Conversely, when the hiding setting is made for the device setting item (fixed area) (Step S50), the controller 11 outputs only the home screen (Step S60).

Subsequently, the controller 11 performs operation determination 1 to determine whether the user has performed an operation on the displayed home screen (Step S70).

When a display setting change has been made as the user operation, the controller 11 detects this and returns the process to Step S30 (Step S70; "display setting change"→Step S30). Conversely, when the user has selected a function menu button on the home screen, the controller 11 detects this and performs display setting determination 2 (Step 70; "function selection" →Step S80).

During the display setting determination 2, the device setting item on the second display screen is determined in accordance with the second display screen based on the function menu button selected by the user and the display/hiding setting of the device setting item (fixed area) on the home screen.

The controller 11 determines the second display screen illustrated in FIG. 3A based on the function menu button selected by the user. Examples of the second display screen corresponding to the function menu button may include a system information screen, copy setting screen, simple copy setting screen, fax setting screen, simple fax setting screen, simple scan setting screen, e-mail setting screen, FTP setting screen, desktop setting screen, shared folder sending setting screen, Internet fax setting screen, data input setting screen, scan save setting screen, etc. The examples of the second display screen illustrated in FIG. 3A are merely examples, and the second display screen according to the present disclosure is not limited to the description herein.

When the second display screen corresponding to the function menu button selected by the user is determined, the controller 11 determines the device setting item on the second display screen in accordance with the display/hiding setting of the device setting item (fixed area) on the home screen.

Specifically, the controller 11 refers to the display screen management table in FIG. 3A and, when the display of the device setting item (fixed area) on the home screen is set, determines the hiding of the device setting item on the second display screen (Step S80; "first display setting" →Step S90). Conversely, when the display of the device setting item (fixed area) on the home screen is set to hiding, the display of the device setting item on the second display screen is determined (Step S80; "second display setting" →Step S100).

Then, the controller 11 outputs the second display screen to the touch panel as the operation inputter 15 based on a determination result at Step S90 or Step S100 (Step S110). Specifically, the controller 11 outputs only the second display screen when the hiding of the device setting item is determined (Step S90). Conversely, when the display of the device setting item is determined (Step S100), the device setting item is output together with the second display screen. The display of the device setting item at this time conforms to the setting content in the display screen management table in FIG. 3A. For example, FIG. 3A illustrates an example where "simple type/display position unfixed" is set as the display mode of the device setting item on the second display screen.

Subsequently, the controller 11 performs operation determination 2 to determine whether the user has performed an operation on the displayed second display screen (Step S120).

When a display setting change has been made as the user operation, the controller 11 detects this and returns the process to Step S80 (Step S120 "display setting change" →Step S80). Conversely, when the user selects a button, or the like, for a functional process on the second display screen, the controller 11 executes the selected functional process (Step S120; "functional process" →Step S130).

Then, the controller 11 determines whether the functional process has ended (Step S140). When it is determined that the functional process has ended, the controller 11 stores the display setting and ends the process (Step S140; Yes→Step S150). In this case, the controller 11 stores the display setting in the storage 23 in a format readable at Steps S20 and S30 (e.g., "display setting: display setting 1 (display setting 2)"). The controller 11 reads the display setting as a part of the device settings at Step S20 so as to set the display/hiding of the device setting item (fixed area) on the home screen. Further, when it is determined that the functional process has not ended, the controller 11 continuously performs the functional process until the functional process ends (Step S140; No→Step S130).

1.3 Operation Example

Figure 5A:
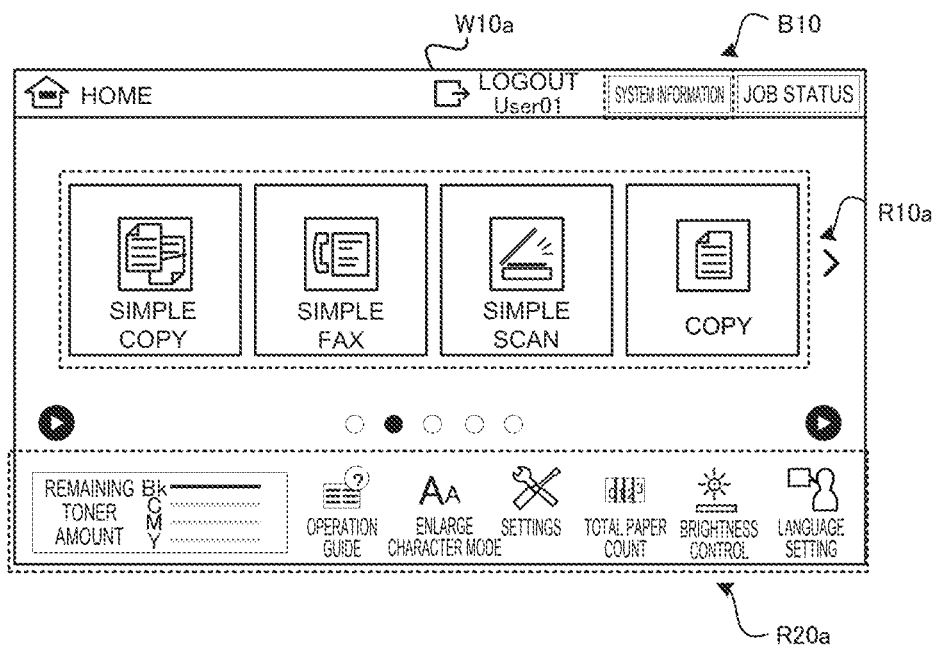
FIGS. 5A and 5B are diagrams illustrating an operation example according to the first embodiment.
Figure 5B:
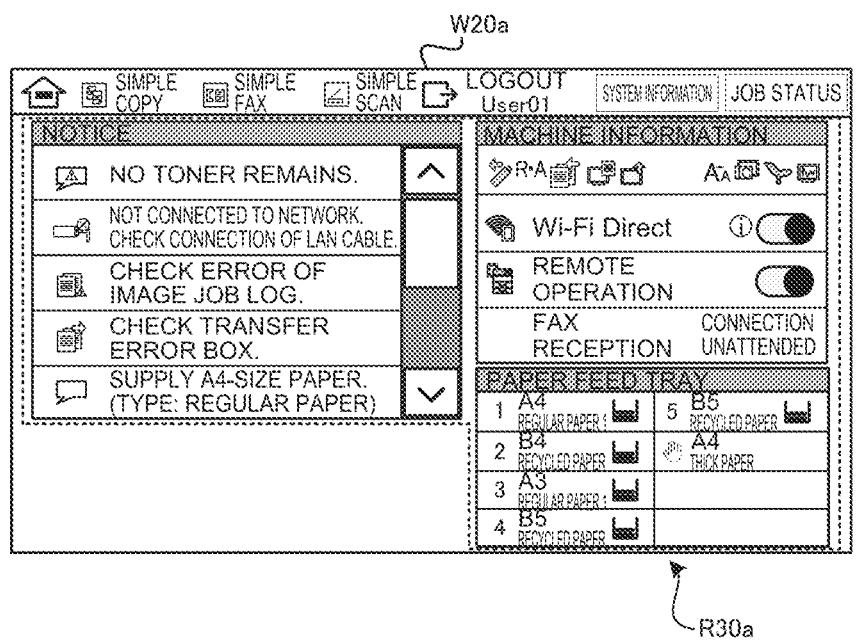

Next, an operation example according to the first embodiment will be described. FIGS. 5A and 5B are diagrams illustrating an operation example of the first display setting in which the display setting of the device setting item (fixed area) on the home screen is set to display.

FIG. 5A is a diagram illustrating one configuration example of a home screen W10a in the first display setting. The home screen W10a includes a function menu button display area R10a, a fixed area display area R20a, and a system information screen display button B10.

The function menu button display area R10a is a display area that displays function menu selection buttons to receive the selection of the function menus. FIG. 5A illustrates an example where function menu selection buttons for simple copy, simple fax, simple scan, and copy are displayed as function menus.

The fixed area display area R20a is an occupation area that displays the device setting items for language setting, operation guide, maintenance, and the like, and is a screen area whose display position is fixed. FIG. 5A illustrates an example where the device setting items for the remaining amount of toner, operation guide, enlarge character mode, settings, total paper count, brightness control, and language setting are displayed. The home screen W10a illustrated in FIG. 5A has a design configuration such that the fixed area display area R20a is formed below the function menu button display area R10a and both the function menu button display area R10a and the fixed area display area R20a are arranged in a balanced manner. The display position of the fixed area display area R20a is not limited to the position illustrated in FIG. 5A, and the fixed area display area R20a may be configured to be positioned for example above the function menu button display area R10a or either one of the right and left end sides of the home screen W10a.

The system information screen display button B10 is an input button for receiving a display instruction input for the system information screen as the second display screen. The system information screen display button B10 may be configured as one type of function menu button that receives the input of a display instruction for the system information screen as the second display screen by the user as is the case with the function menu button displayed on the function menu button display area R10a. When the pressing of the system information screen display button B10 is received, the controller 11 displays a system information screen W20a illustrated in FIG. 5B.

FIG. 5B is a diagram illustrating one configuration of the system information screen W20a in the first display setting. The system information screen W20a includes a system information display area R30a. The system information display area R30a includes, for example, a notice display area that displays, as a notice, the information to be informed to the user, a machine information display area that displays machine information (device information) on the multifunction peripheral 10, and a paper feed tray information display area that displays the information about the size and the remaining number of pieces of paper stored in the paper feed tray.

The operation example described in FIGS. 5A and 5B relates to the first display setting in which the display setting of the device setting item (fixed area) on the home screen is set to display. Therefore, the device setting item is not displayed on the system information screen W20a that is displayed as the second display screen in response to the pressing of the function menu button (the system information screen display button B10) selected via the home screen.

Figure 6A:
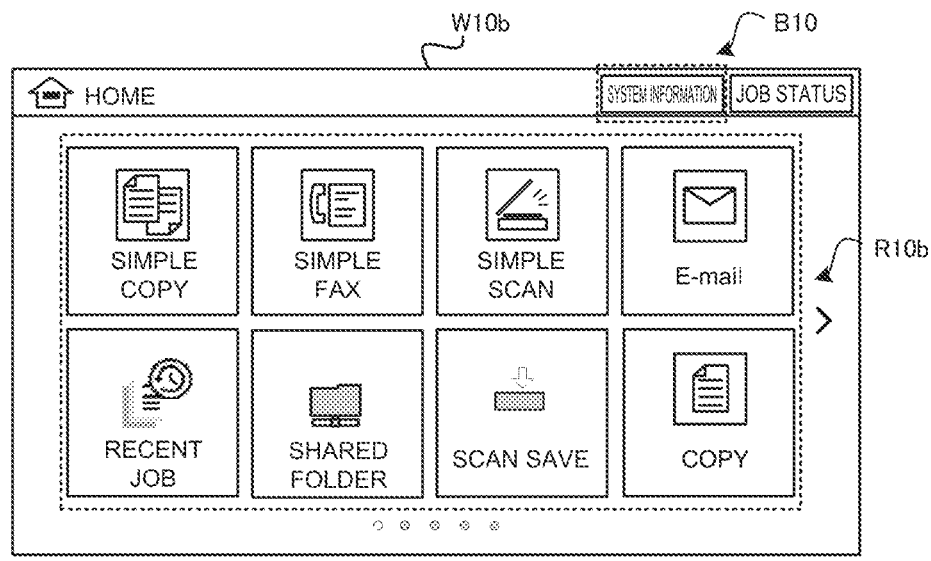
FIGS. 6A and 6B are diagrams illustrating an operation example according to the first embodiment.
Figure 6B:
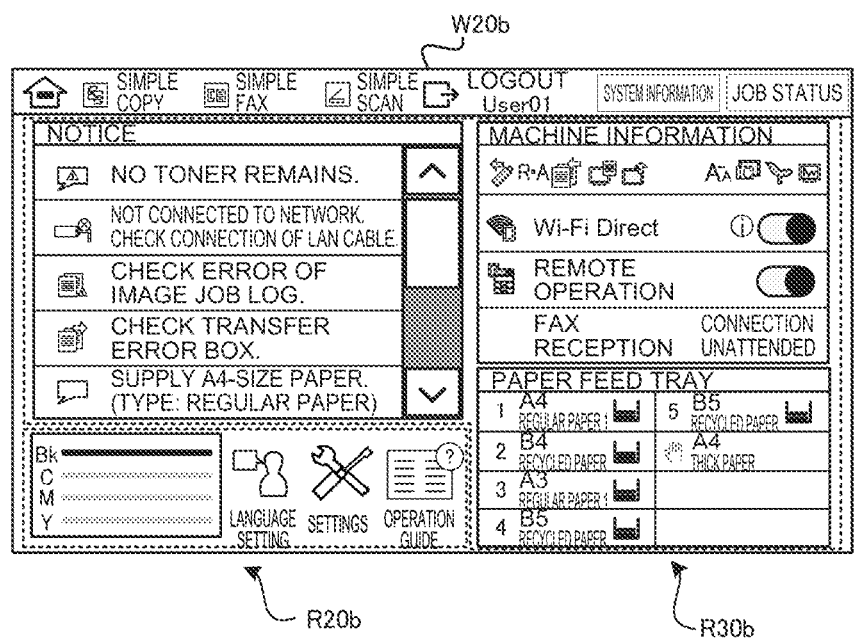

FIGS. 6A and 6B are diagrams illustrating an operation example of the second display setting in which the display setting of the device setting item (fixed area) on the home screen is set to hiding.

FIG. 6A is a diagram illustrating one configuration example of a home screen W10b in the second display setting. The home screen W10b includes a function menu button display area R10b and the system information screen display button B10.

The function menu button display area R10b is a display area that displays function menu selection buttons to receive the selection of the function menus. FIG. 6A illustrates an example where function menu selection buttons for recent job, shared folder, scan save, and copy as well as simple copy, simple fax, simple scan, and e-mail are displayed as function menus.

The home screen W10b in the second display setting has the screen configuration such that the function menu buttons for frequently used simple copy, and the like, are displayed in a large size and the display of the fixed area for the device setting items, which are assumed to be less frequently used, are eliminated.

The system information screen display button B10 is an input button for receiving a display instruction input for the system information screen as the second display screen. The controller 11 displays the system information screen W20b illustrated in FIG. 6B in response to the pressing of the system information screen display button B10.

FIG. 6B is a diagram illustrating one configuration of the system information screen W20b in the second display setting. The system information screen W20b includes a system information display area R30b and a device setting item display area R20b. The system information display area R30b may have the same configuration as that of the system information display area R30a for the system information screen W20a.

The operation example described in FIGS. 6A and 6B relates to the second display setting in which the display setting of the device setting item (fixed area) on the home screen is set to hiding. Therefore, the system information screen W20b, which is displayed as the second display screen in response to the pressing of the function menu button (the system information screen display button B10) selected via the home screen W10b, includes the device setting item display area R20b for displaying the device setting item.

The device setting item display area R20b is an example of the mode output as the simple type obtained by simplifying the item output in the fixed area. The device setting item display area R20b may be configured as a display mode obtained by simplifying the device setting item displayed in the fixed area, including the device setting items output in the fixed area such as the remaining amount of toner, language setting, settings, and operation guide. The display size of the device setting item display area R20b may be changed as appropriate in accordance with the screen area occupied by the system information display area R30b. For example, when the notice display area in the system information display area R30b is smaller than the display area illustrated in FIG. 6B, the display area of the device setting item display area R20b may be enlarged to increase the number of device setting items to be displayed. Furthermore, the display position of the device setting item display area R20b may be unfixed, and therefore in some display design of the system information display area R30b, the device setting item display area R20b may be provided at a position different from the display position illustrated in FIG. 6B.

As described above, according to the first embodiment, based on the display setting of the device setting item on the home screen, the display mode of the device setting item on the other display screen is determined so that it is possible to provide the display device, or the like, which may improve the user convenience.

2 Second Embodiment

A second embodiment is an embodiment where, in the first display setting in which the display setting of the device setting item (fixed area) on the home screen is set to display, a shortcut icon that receives a display instruction for the device setting item is displayed as the display mode of the device setting item on the second display screen.

2.1 Functional Configuration

The functional configuration of a multifunction peripheral according to the second embodiment may be the same as that of the multifunction peripheral 10 according to the first embodiment, and therefore the description thereof will be omitted here.

2.2 Process Flow

Figure 7:
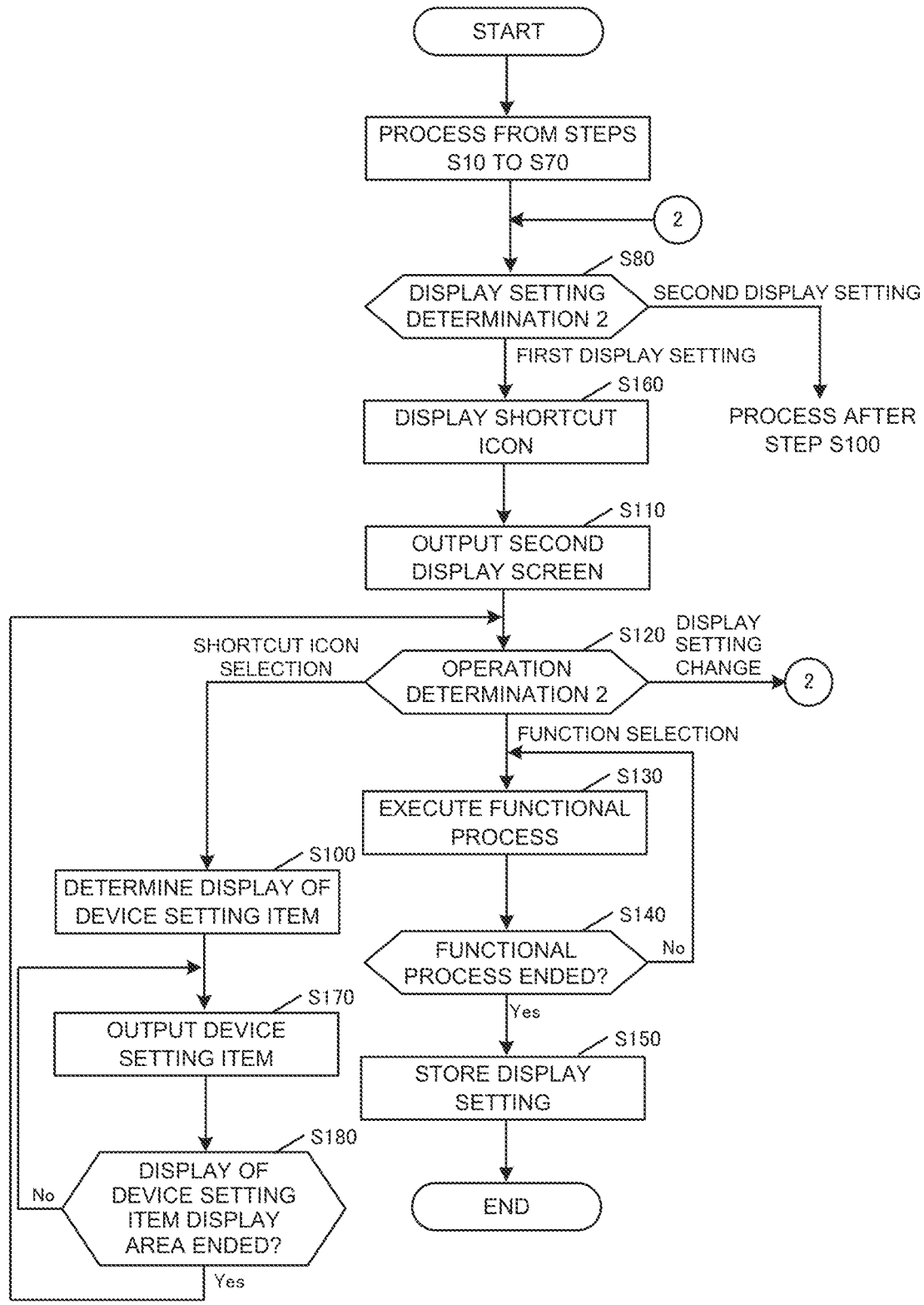
FIG. 7 is a flowchart illustrating a process flow according to a second embodiment.

Next, a process flow according to the second embodiment will be described using the flowchart in FIG. 7. The process before Step S80 in FIG. 7 may be the same as the process from Steps S10 to S70 in FIG. 4 according to the first embodiment. Therefore, different processes after Step S80 will be described here. The part with the same process as that described in FIG. 4 may be denoted by the same step code and the description thereof may be omitted.

After the process from Steps S10 to S70 is performed, the controller 11 performs display setting determination 2 (Step S80).

During the display setting determination 2, the display/hiding of the shortcut icon, which receives a display instruction for the device setting item on the second display screen, is determined in accordance with the display/hiding setting of the device setting item (fixed area) on the second display screen and the home screen based on the function menu button selected by the user.

When the second display screen corresponding to the function menu button selected by the user is determined, the controller 11 determines the display/hiding of the shortcut icon on the second display screen in accordance with the device setting item (fixed area) on the home screen.

Specifically, the controller 11 refers to a display screen management table in FIG. 3B. Here, FIG. 3B is a table illustrating one mode of the data structure of the display screen management table according to the second embodiment.

When the display of the device setting item (fixed area) on the home screen is set (the first display setting), the display of the shortcut icon on the second display screen is determined (Step S80; "first display setting" →Step S160). When the display of the device setting item (fixed area) on the home screen is set, the controller 11 sets the hiding of the shortcut icon on the home screen. Conversely, when the hiding of the device setting item (fixed area) on the home screen is set (the second display setting), the hiding of the shortcut icon on the second display screen is determined. In this case, the process after Step S100 in FIG. 7 may be performed (Step S80; "second display setting" →process after Step S100).

Then, the controller 11 outputs the second display screen to the touch panel as the operation inputter 15 based on a determination result at Step S160 (Step S110). Specifically, the controller 11 outputs the shortcut icon together with the second display screen. The controller 11 displays the shortcut icon, which is output together with the second display screen, in a predetermined display area (e.g., system area) of the second display screen.

Then, the controller 11 performs the operation determination 2 to determine whether the user has performed an operation on the displayed second display screen (Step S120).

When a display setting change has been made as the user operation, the controller 11 detects this and returns the process to Step S80 (Step S120 "display setting change" →Step S80). Conversely, when the user selects a button, or the like, for a functional process on the second display screen, the controller 11 executes the selected functional process (Step S120; "function selection" →Step S130).

Then, the controller 11 determines whether the functional process has ended (Step S140). When it is determined that the functional process has ended, the controller 11 stores the display setting and ends the process (Step S140; Yes→Step S150). In this case, the controller 11 stores the display setting in the storage 23 in a format readable at Steps S20 and S30 (e.g., "display setting: display setting 1 (display setting 2)"). The controller 11 reads the display setting as a part of the device settings at Step S20 so as to set the display/hiding of the device setting item (fixed area) on the home screen. Conversely, when it is determined that the functional process has not ended, the controller 11 continuously performs the functional process until the functional process ends (Step S140; No→Step S130).

When it is detected that the user has selected the shortcut icon, the controller 11 determines the display of the device setting item (Step S120; "shortcut icon selection" →Step S100).

The controller 11 outputs the device setting item (Step S170). Here, as the screen configuration of the display screen, a device setting item display area may be provided on a portion of the screen area of the second display screen, or the device setting item display area may be displayed on the screen area of the second display screen in a superimposed manner.

Until the display of the device setting item display area ends, the controller 11 continuously displays the area (Step S180; No→Step S170). Conversely, when the display of the device setting item display area ends, the controller 11 returns the process to Step S120 (Step S180; Yes→Step S120).

2.3 Operation Example

Figure 8A:
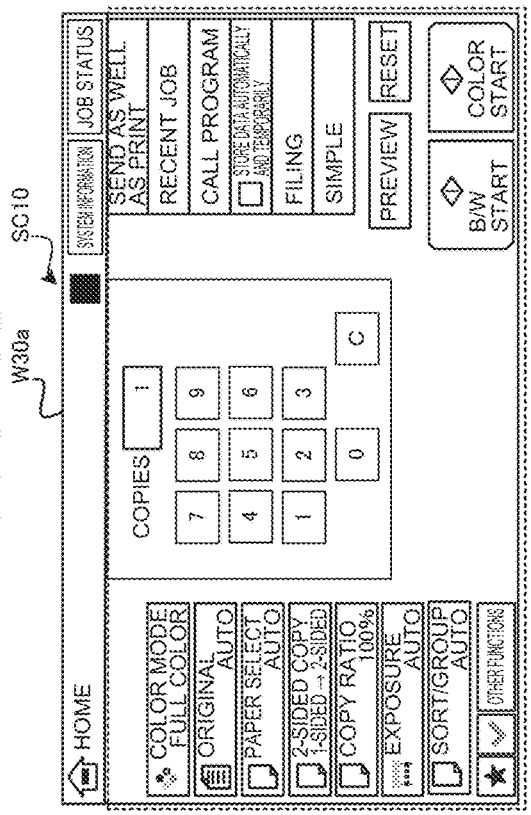
FIGS. 8A to 8C are diagrams illustrating an operation example according to the second embodiment.
Figure 8B:
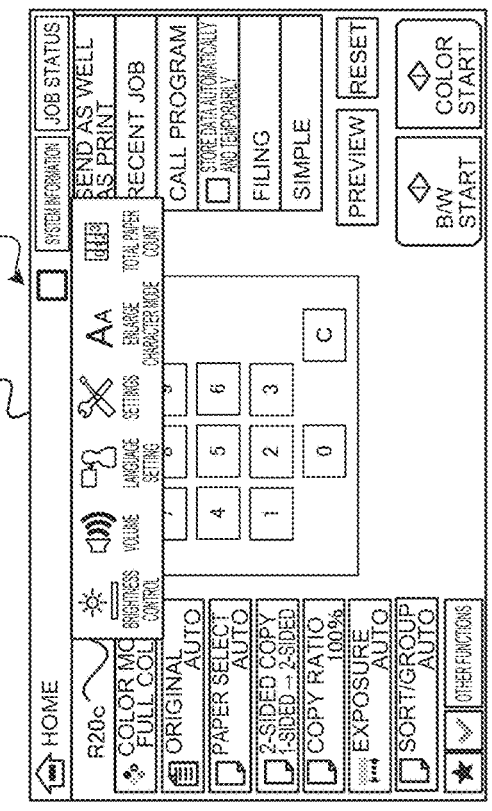
Figure 8C:
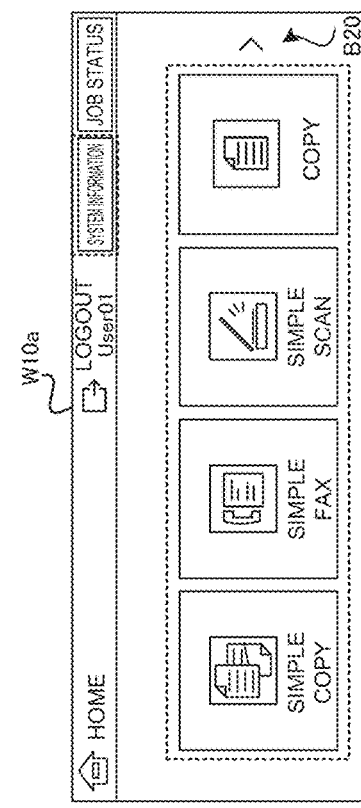

Next, an operation example according to the second embodiment will be described. FIGS. 8A to 8C are diagrams illustrating an operation example where, in the first display setting where the display setting of the device setting item (fixed area) on the home screen is set to display, a shortcut icon is displayed to display the device setting item on the second display screen. In the description of FIGS. 8A to 8C, the same configuration as that described in FIGS. 5A, 5B, 6A, 6B, and the like, according to the first embodiment is denoted by the same reference mark, and the description thereof may be omitted.

FIG. 8A is a diagram illustrating one configuration example of the home screen W10a according to the second embodiment. The home screen may have the same configuration as that of the home screen W10a described in FIG. 5A according to the first embodiment. Therefore, the home screen W10a includes the fixed area display area R20a, and the device setting items for language setting, operation guide, maintenance, and the like, are displayable on the fixed area.

FIG. 8B is a diagram illustrating an operation example when the function menu button selected by the user is the function menu button for copying and the controller 11 determines that a copy setting screen W30a is the second display screen. When the function menu button desired by the user is not displayed in the function menu button display area R10a on the home screen W10a, the user presses a function menu selection button B20 provided next to the function menu button display area R10a so as to display the desired function menu button.

The copy setting screen W30a includes a function setting display area R40a provided across the entire screen and a shortcut icon SC10 displayed in the system area.

Input/selection buttons that receive input/selection of setting values for execution of the copy function, a start button that receives a copy execution instruction input, and the like, are provided in the function setting display area R40*a*. The user confirms the setting values and the setting content for the setting items displayed in the function setting display area R40*a* and presses a black/white start button or a color start button so as to execute the copy function.

The shortcut icon SC10 is a shortcut icon that receives a display instruction input for the device setting item. When the user selects (presses) the shortcut icon SC10, the controller 11 displays a device setting item display area R20*c* on a copy setting screen W30*b* in a superimposed manner as illustrated in FIG. 8C. At this time, in order to indicate that the shortcut icon SC10 is being selected, the display mode of the shortcut icon SC10 after selection may be different from that of the shortcut icon SC10 before selection, as illustrated in FIG. 8C. FIG. 8C illustrates an example where the shortcut icon SC10 has been selected and thus the shortcut icon SC10 has changed to be displayed in white on a black frame.

Figure 9A:
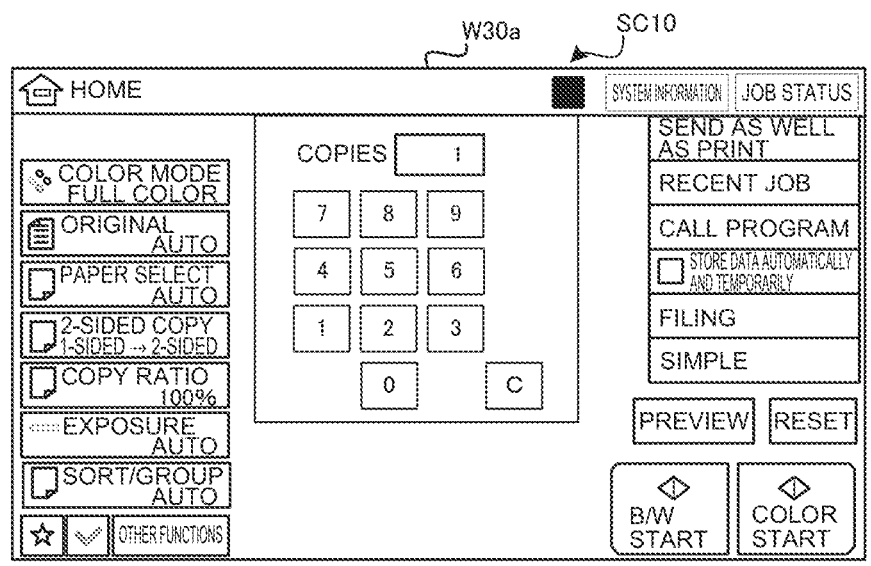
FIGS. 9A and 9B are diagrams illustrating an operation example according to the second embodiment.
Figure 9B:
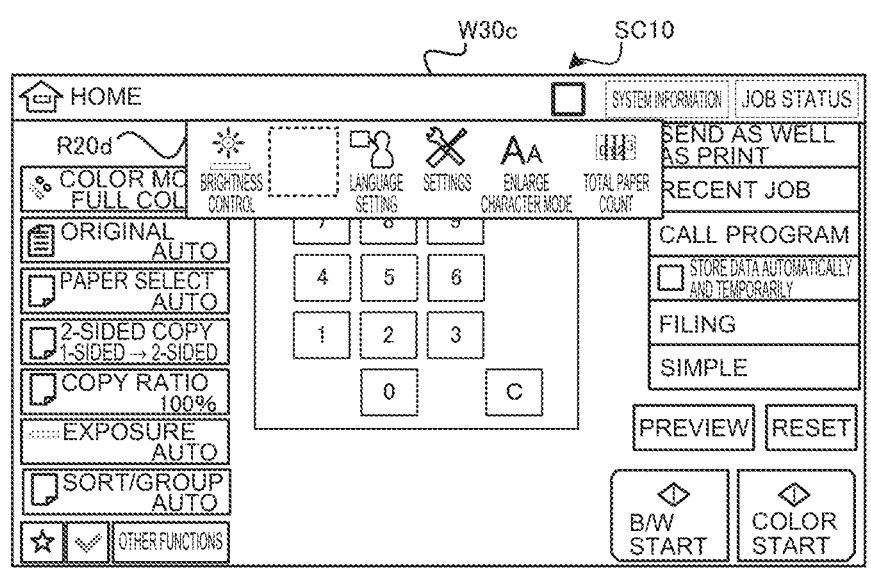

FIGS. 9A and 9B are diagrams illustrating another operation example when the function menu button selected by the user is the function menu button for copying and the controller 11 determines that the copy setting screen W30*a* is the second display screen. FIG. 9A illustrates one configuration example of the copy setting screen W30*a* according to another operation example. The copy setting screen W30*a* illustrated in FIG. 9A may also have the same configuration as that of the copy setting screen W30*a* described in FIG. 8B, and therefore the same reference marks are used and the description thereof is omitted.

FIG. 9B is a diagram illustrating one mode of a device setting item display area R20*d* that is displayed by the controller 11 on a copy setting screen W30*c* in a superimposed manner when the shortcut icon SC10 is selected on the copy setting screen W30*a* in FIG. 9A. The device setting item display area R20*d* illustrated in FIG. 9B has a mode to display specific device setting items related to the copy function. In the case of FIG. 9B, the device setting item for "volume", which is not related to the copy function, is hidden. That is, in another operation example described here, there is a restriction on the display of the device setting item that is not related to the function corresponding to the function menu button selected by the user. For example, when the second display screen is the copy setting screen W30*c*, as illustrated in FIG. 9B, the controller 11 displays only the device setting items related to copying (brightness control/language setting/settings/enlarge character mode/total paper count) in the device setting item display area R20*d*.

Conversely, for example, when the second display screen is a setting screen for image sending (not illustrated), the controller 11 displays the device setting items for image sending (brightness control/volume/language setting/settings/enlarge character mode/total paper count) in the device setting item display area R20*d*.

As described above, the display of the device setting item is restricted in accordance with the function setting screen determined as the second display screen (the display of the device setting item that is not related to the function setting screen determined as the second display screen is restricted), and thus it is possible to prevent the setting that is considered to be invalid for the execution of the function via the function setting screen.

As described above, the second embodiment is an embodiment in which, in the first display setting where the display setting of the device setting item (fixed area) on the home screen is set to display, the shortcut icon is displayed to receive a display instruction for the device setting item on the second display screen so that the device setting item may be displayed by simply selecting the shortcut icon even from the second display screen.

3 Third Embodiment

A third embodiment is an embodiment in which, in the second display setting where the display setting of the device setting item on the home screen is set to hiding, the display of the device setting item is determined based on the detection of a swipe action on the home screen or the second display screen as the display mode of the device setting item.

3.1 Functional Configuration

The functional configuration of a multifunction peripheral according to the third embodiment may be the same as that of the multifunction peripheral 10 according to the first embodiment, and therefore the description here is omitted.

3.2 Process Flow

Figure 10:
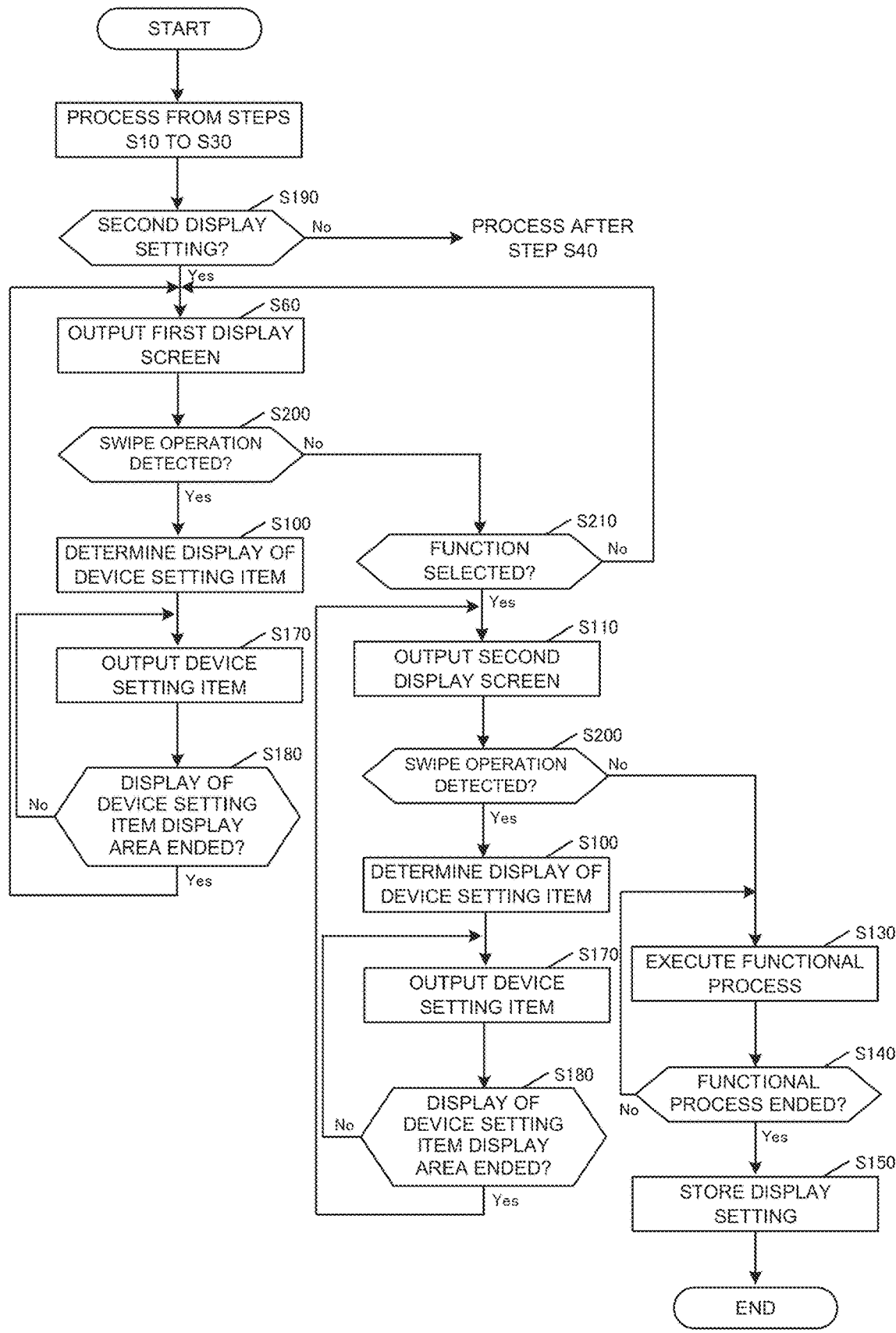
FIG. 10 is a flowchart illustrating a process flow according to a third embodiment.

Next, a process flow according to the third embodiment will be described using the flowchart in FIG. 10. The process before Step S190 in FIG. 10 may be the same as the process from Steps S10 to S30 in FIG. 4 according to the first embodiment. Therefore, different processes after Step S190 will be described here. The part with the same process as that described in FIGS. 4, 7, and the like, may be denoted by the same reference mark and the description thereof may be omitted.

After the process from Steps S10 to S30 is performed, the controller 11 determines whether the display setting is the second display setting (Step S190).

When it is determined that the display setting is the second display setting, the controller 11 outputs only the home screen (Step S190; Yes→Step S60). Conversely, when it is determined that the display setting is the first display setting, the controller 11 may perform the process after Step S40 in FIG. 4 (Step S190; No→"process after Step S40").

Subsequently, the controller 11 determines whether a swipe operation has been detected on the home screen (Step S200). The swipe operation is one type of gesture operation to move the touch position from the starting point on the display screen and may be, for example, a gesture operation to move the touch position from each side or each corner portion forming the outer frame of the display screen toward the inner side of the display screen or may be a gesture operation to move the touch position from a predetermined position within the display screen in a predetermined direction. An operational definition of the swipe operation and the device setting item to be displayed by detection of the swipe operation may be set via a setting screen (not illustrated).

When the swipe operation has been detected, the controller 11 refers to a display screen management table in FIG. 3C to determine the display of the device setting item on the home screen (Step S200; Yes→Step S100). Here, FIG. 3C is a table illustrating one mode of the data structure of the display screen management table according to the third embodiment.

Then, the controller 11 outputs the device setting item based on a determination result at Step S100. Here, as the screen configuration of the display screen, a device setting item display area may be provided on a portion of the screen area of the home screen, or the device setting item display area may be displayed on the screen area of the home screen in a superimposed manner (Step S170). The controller 11 continuously displays the device setting item display area until a display end instruction for the device setting item display area is input (Step S180; No→Step S170). Conversely, when a display end instruction for the device setting item display area is input, the controller 11 ends the display of the device setting item display area and returns the process to Step S60 (Step S180; Yes→Step S60).

When no swipe operation is detected, the controller 11 determines whether the user has selected the function menu button on the home screen (Step S200; No→Step S210). When it is determined that the function menu button has been selected, the controller 11 determines the second display screen corresponding to the function menu button selected by the user and outputs the determined second display screen to the touch panel as the operation inputter 15 (Step S210; Yes→Step S110). Conversely, when the user has not selected the function menu button, the controller 11 returns the process to Step S60 and continuously displays the home screen (Step S210; No→Step S60).

Subsequently, the controller 11 determines whether a swipe operation has been detected on the second display screen (Step S200).

When the swipe operation has been detected, the controller 11 refers to the display screen management table in FIG. 3C to determine the display of the device setting item on the second display screen (Step S200; Yes→Step S100).

Then, the controller 11 outputs the device setting item based on a determination result at Step S100. Here, as the screen configuration of the display screen, a device setting item display area may be provided on a portion of the screen area of the second display screen, or the device setting item display area may be displayed on the screen area of the second display screen in a superimposed manner (Step S170). The controller 11 continuously displays the device setting item display area until a display end instruction for the device setting item display area is input (Step S180; No→Step S170). Conversely, when a display end instruction for the device setting item display area is input, the controller 11 ends the display of the device setting item display area and returns the process to Step S110 (Step S180; Yes→Step S110).

When no swipe operation has been detected, the controller 11 executes the functional process for the second display screen (Step S200; No→Step S130).

Then, the controller 11 determines whether the functional process has ended (Step S140). When it is determined that the functional process has ended, the controller 11 stores the display setting and ends the process (Step S140; Yes→Step S150). Conversely, when it is determined that the functional process has not ended, the controller 11 continuously performs the functional process until the functional process ends (Step S140; No→Step S130).

3.3 Operation Example

Figure 11A:
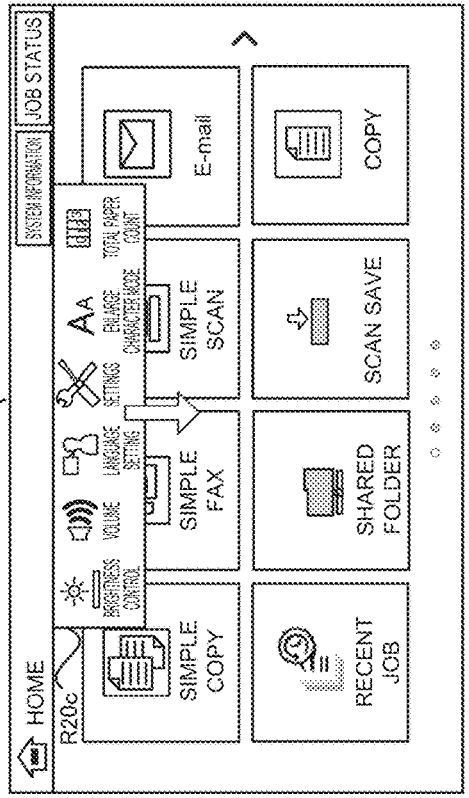
FIGS. 11A to 11C are diagrams illustrating an operation example according to the third embodiment.
Figure 11B:
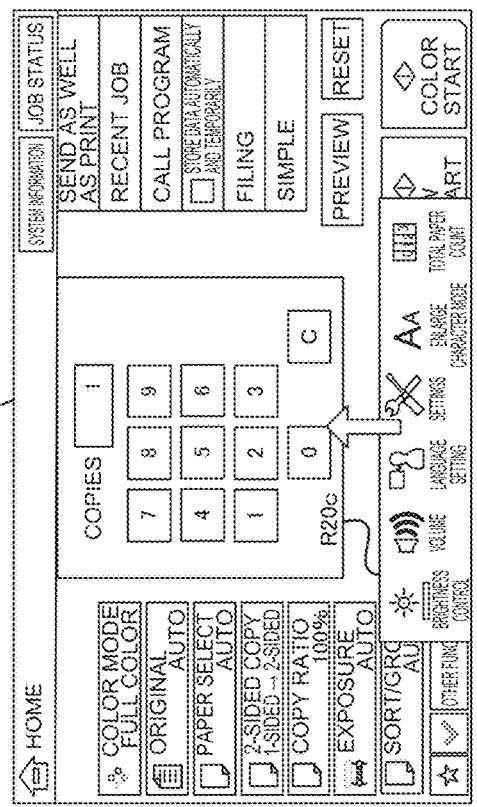
Figure 11C:
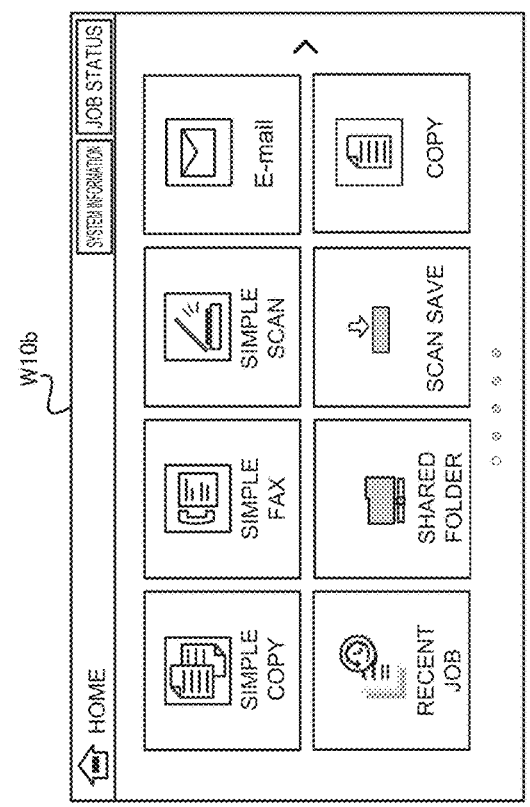

Next, an operation example according to the third embodiment will be described. FIGS. 11A to 11C are diagrams illustrating an operation example where, in the second display setting where the display setting of the device setting item on the home screen is set to hiding, the display of the device setting item is determined based on the detection of the swipe operation on the home screen or the second display screen.

FIG. 11A is a diagram illustrating one configuration of the home screen W10b in the second display setting. The home screen W10b may have the same configuration as that of the home screen W10b illustrated in FIG. 6A, and therefore the same reference marks are used here and the description thereof is omitted.

FIG. 11B illustrates a display example of the device setting item display area R20c that is displayed by the controller 11 on the home screen W10b in a superimposed manner when the user's swipe operation has been detected on the home screen W10b illustrated in FIG. 11A.

FIG. 11C illustrates a display example of the device setting item display area R20c that is displayed by the controller 11 on a copy setting screen W30d as the second display screen in a superimposed manner when the user's swipe operation has been detected on the copy setting screen W30d.

As illustrated in both FIGS. 11B and 11C, in the second display setting where the display of the device setting item on the home screen W10b is set to hiding, the device setting item display area R20c is displayable by the detection of the swipe operation on the screen such as the home screen W10b or the copy setting screen W30d (the second display screen). In this case, the device setting item display area R20c may be displayed by the swipe operation from any position of the top, bottom, left, and right sides forming the outer frame of the display screen and the corner portions where the sides intersect with each other. It is also possible to have a configuration such that the device setting item display area R20c is displayed by the swipe operation from the inner position of each side toward the screen center or from a position near the screen center toward the outer side of each side.

In the above description, the swipe operation is described as an example of the gesture operation on the home screen W10b or the second display screen. There is no limitation on the gesture operation applicable to the third embodiment other than the swipe operation, such as a swipe operation by multiple fingers, a double tap operation, a flick operation, a scroll operation, and a long-press operation at a position other than the position where the function menu button is provided, as long as the gesture operation is not mistakenly detected as a selection operation on the function menu button, and a plurality of gesture operations may be used in combination.

In FIG. 11C, the copy setting screen W30d is described as an example of the second display screen on which the device setting item display area R20c is displayable based on the detection of the swipe operation, but the second display screen is not limited thereto. The third embodiment is applicable to various setting screens corresponding to the function menu buttons illustrated in FIG. 3A, such as simple copy setting screen, fax setting screen, simple fax setting screen, simple scan setting screen, e-mail setting screen, FTP setting screen, desktop setting screen, shared folder sending setting screen, Internet fax setting screen, data input setting screen, and scan save setting screen.

Furthermore, the display of the device setting item display area R20c based on the detection of the swipe operation may also be restricted. For example, in the configuration where the device setting item display area R20c is displayed by the detection of the swipe operation on the system information screen illustrated in FIGS. 5A, 5B, 6A, 6B, and the like, there is a possibility that the information for the settings is displayed redundantly. In this case, the display of the redundant information may cause an unnecessary use of the limited screen area and result in a redundant expression. Therefore, when the display content in the device setting item display area R20c overlap partially or completely with the display content on the second display screen, the display of the device setting item display area R20c is restricted so as to make effective use of the screen area.

As described above, the third embodiment is an embodiment in which, in the second display setting where the display setting of the device setting item on the home screen is set to hiding, the device setting item is displayed based on the detection of the swipe operation on the home screen or the second display screen so that the device setting item may be displayed more easily by the gesture operation such as the swipe operation even from the second display screen.

4 Fourth Embodiment

A fourth embodiment is an embodiment in which, in the second display setting where the display setting of the device setting item on the home screen is set to hiding, the display of the device setting item is determined based on the selection of the shortcut icon displayed on the home screen or the second display screen as the display mode of the device setting item.

4.1 Functional Configuration

The functional configuration of a multifunction peripheral according to the fourth embodiment may be the same as that of the multifunction peripheral 10 according to the first embodiment, and therefore the description thereof is omitted here.

4.2 Process Flow

Figure 12:
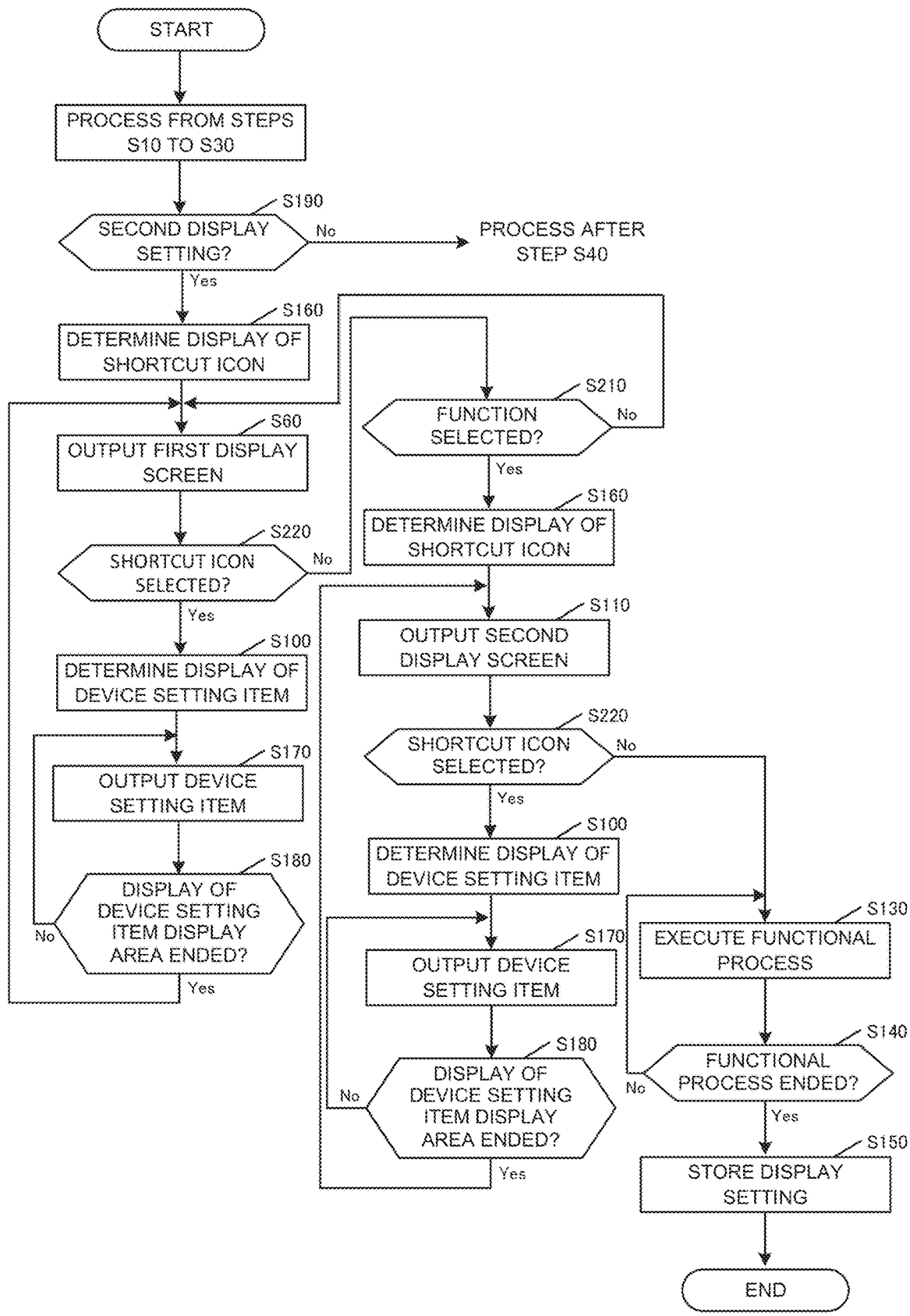
FIG. 12 is a flowchart illustrating a process flow according to a fourth embodiment.

Next, a process flow according to the fourth embodiment will be described using the flowchart in FIG. 12. The process before Step S190 in FIG. 12 may be the same as the process from Steps S10 to S30 in FIG. 4 according to the first embodiment. Therefore, different processes after Step S190 will be described here. The part with the same process as that described in FIG. 4, 7, 10, or the like, may be denoted by the same reference mark, and the description thereof may be omitted.

After the process from Steps S10 to S30 is performed, the controller 11 determines whether the display setting is the second display setting (Step S190).

When it is determined that the display setting is the second display setting, the controller 11 determines the display of the shortcut icon on the first display screen (home screen) (Step S190; Yes→Step S160). Conversely, when it is determined that the display setting is the first display setting, the controller 11 may perform the process after Step S40 in FIG. 4 (Step S190; No→"process after Step S40").

Then, the controller 11 outputs the shortcut icon together with the home screen based on determination results at Steps S190 and S160 (Step S60). The controller 11 displays the shortcut icon, which is output together with the home screen, in a predetermined display area (system area) of the home screen.

Subsequently, the controller 11 determines whether the user has selected the shortcut icon (Step S220). When it is determined that the user has selected the shortcut icon, the controller 11 refers to a display screen management table in FIG. 3D to determine the display of the device setting item (Step S220; Yes→Step S100). Here, FIG. 3D is a table illustrating one mode of the data structure of the display screen management table according to the fourth embodiment.

The controller 11 outputs the device setting item based on a determination result at Step S100. Here, as the screen configuration of the display screen, a device setting item display area may be provided on a portion of the screen area of the home screen, or the device setting item display area may be displayed on the screen area of the home screen in a superimposed manner (Step S170). The controller 11 continuously displays the device setting item display area until a display end instruction for the device setting item display area is input (Step S180; No→Step S170). Conversely, when a display end instruction for the device setting item display area is input, the controller 11 ends the display of the device setting item display area and returns the process to Step S60 (Step S180; Yes→Step S60).

When the shortcut icon has not been selected, the controller 11 determines whether the user has selected a function menu button on the home screen (Step S220; No→Step S210). When it is determined that the function menu button has been selected, the controller 11 determines the second display screen corresponding to the function menu button selected by the user. In addition, the controller 11 determines the display of the shortcut icon on the second display screen (Step S160). Conversely, when the user has not selected the function menu button, the controller 11 returns the process to Step S60 and continuously displays the home screen (Step S210; No→Step S60).

Then, the controller 11 outputs the shortcut icon together with the second display screen based on determination results at Steps S210 and S160 (Step S110). The controller 11 displays the shortcut icon, which is output together with the second display screen, in a predetermined display area (system area) of the second display screen.

Subsequently, the controller 11 determines whether the user has selected the shortcut icon (Step S220). When it is determined that the user has selected the shortcut icon, the controller 11 refers to a display screen management table in FIG. 3D to determine the display of the device setting item on the second display screen (Step S220; Yes→Step S100).

Then, the controller 11 outputs the device setting item based on a determination result at Step S100. Here, as the screen configuration of the display screen, a device setting item display area may be provided on a portion of the screen area of the second display screen, or the device setting item display area may be displayed on the screen area of the second display screen in a superimposed manner (Step S170). The controller 11 continuously displays the device setting item display area until a display end instruction for the device setting item display area is input (Step S180; No→Step S170). Conversely, when a display end instruction for the device setting item display area is input, the controller 11 ends the display of the device setting item display area and returns the process to Step S110 (Step S180; Yes→Step S110).

When the shortcut icon has not been selected, the controller 11 executes the functional process for the second display screen (Step S220; No→Step S130).

Then, the controller 11 determines whether the functional process has ended (Step S140). When it is determined that the functional process has ended, the controller 11 stores the display setting and ends the process (Step S140; Yes→Step S150). Conversely, when it is determined that the functional process has not ended, the controller 11 continuously performs the functional process until the functional process ends (Step S140; No→Step S130).

4.3 Operation Example

Figure 13A:
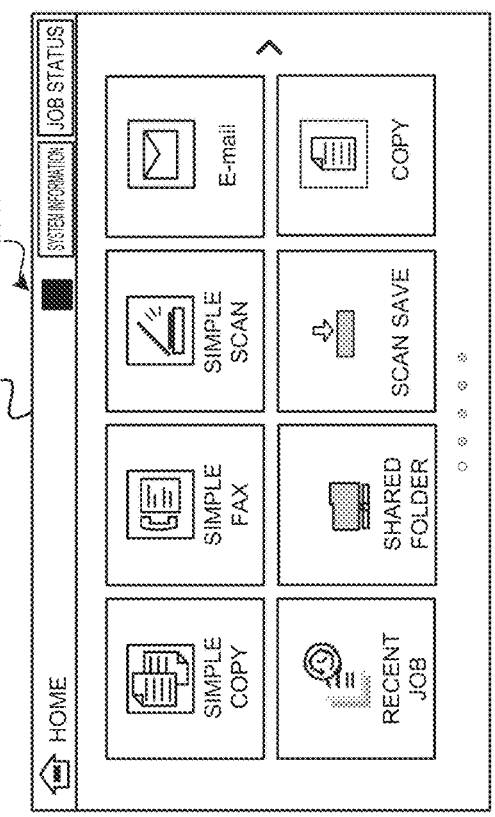
FIGS. 13A to 13C are diagrams illustrating an operation example according to the fourth embodiment.
Figure 13B:
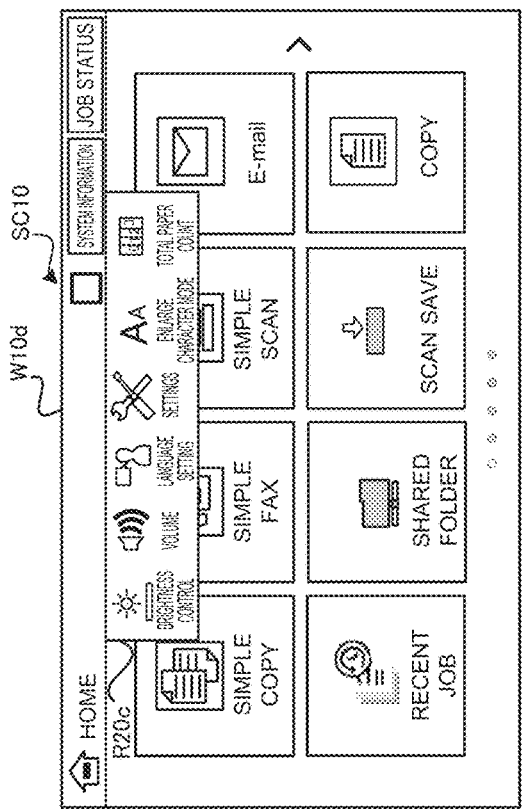
Figure 13C:
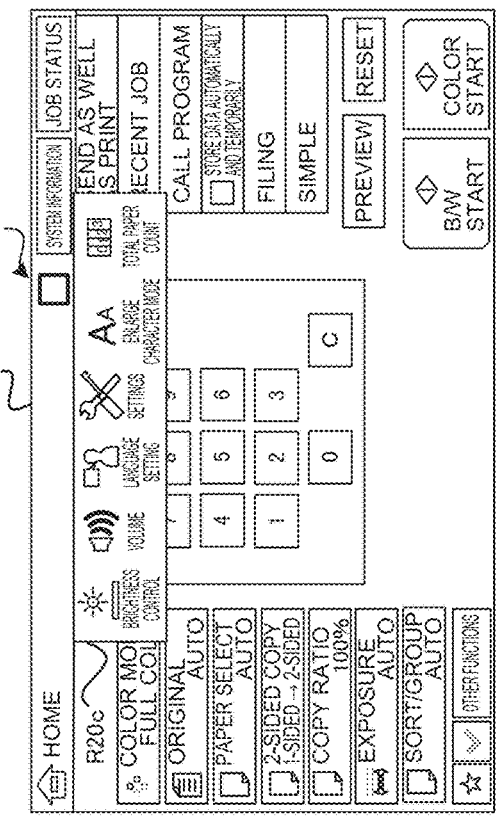

Next, an operation example according to the fourth embodiment will be described. FIGS. 13A to 13C are diagrams illustrating an operation example where, in the second display setting where the display setting of the device setting item on the home screen is set to hiding, the display of the device setting item is determined based on the selection of the shortcut icon on the home screen or the second display screen.

FIG. 13A is a diagram illustrating one configuration of a home screen W10c in the second display setting. The home screen W10c may have substantially the same configuration as that of the home screen W10b illustrated in FIG. 6A, but is different from the home screen W10b in that the shortcut icon SC10 is displayed in a predetermined display area (system area) of the home screen W10c.

FIG. 13B illustrates a display example of the device setting item display area R20c that is displayed by the controller 11 on the home screen W10c in a superimposed manner when the user selects the shortcut icon SC10 on the home screen W10c illustrated in FIG. 13A.

FIG. 13C illustrates a display example of the device setting item display area R20c that is displayed by the controller 11 on the copy setting screen W30b in a superimposed manner when the user selects the shortcut icon SC10 on the copy setting screen W30b as the second display screen.

As illustrated in both FIGS. 13B and 13C, in the second display setting where the display of the device setting item on the home screen W10c is set to hiding, the device setting item display area R20c is displayable by the selection of the shortcut icon SC10 on the screen such as the home screen W10c or the copy setting screen W30b (the second display screen).

In FIG. 13C, the copy setting screen W30b is described as an example of the second display screen on which the device setting item display area R20c is displayable based on the user's selection of the shortcut icon SC10, but the second display screen is not limited thereto. The fourth embodiment is applicable to various setting screens corresponding to the function menu buttons illustrated in FIG. 3A, such as simple copy setting screen, fax setting screen, simple fax setting screen, simple scan setting screen, e-mail setting screen, FTP setting screen, desktop setting screen, shared folder sending setting screen, Internet fax setting screen, data input setting screen, and scan save setting screen.

Furthermore, the display of the device setting item display area R20c based on the selection of the shortcut icon SC10 may be restricted. For example, in the configuration where the device setting item display area R20c is displayed by the selection of the shortcut icon on the system information screen illustrated in FIGS. 5A, 5B, 6A, 6B, and the like, there is a possibility that the information for the settings is displayed redundantly. In this case, the display of the redundant information may cause an unnecessary use of the limited screen area. Therefore, when the display content in the device setting item display area R20c overlap partially or completely with the display content on the second display screen, the display of the device setting item display area R20c is restricted so as to make effective use of the screen area.

As described above, the fourth embodiment is an embodiment in which, in the second display setting where the display setting of the device setting item on the home screen is set to hiding, the device setting item is displayed based on the selection of the shortcut icon on the home screen or the second display screen so that the device setting item may be displayed more easily by the selection of the shortcut icon even from the second display screen.

5 Fifth Embodiment

A fifth embodiment is an embodiment in which, in the second display setting where the display setting of the device setting item on the home screen is set to hiding, the display of the device setting item is determined based on the presence or absence of occurrence of an event related to the device setting item as the display mode of the device setting item.

5.1 Functional Configuration

The functional configuration of a multifunction peripheral according to the fifth embodiment may be the same as that of the multifunction peripheral 10 according to the first embodiment, and therefore the description thereof is omitted here.

5.2 Process Flow

Figure 14:
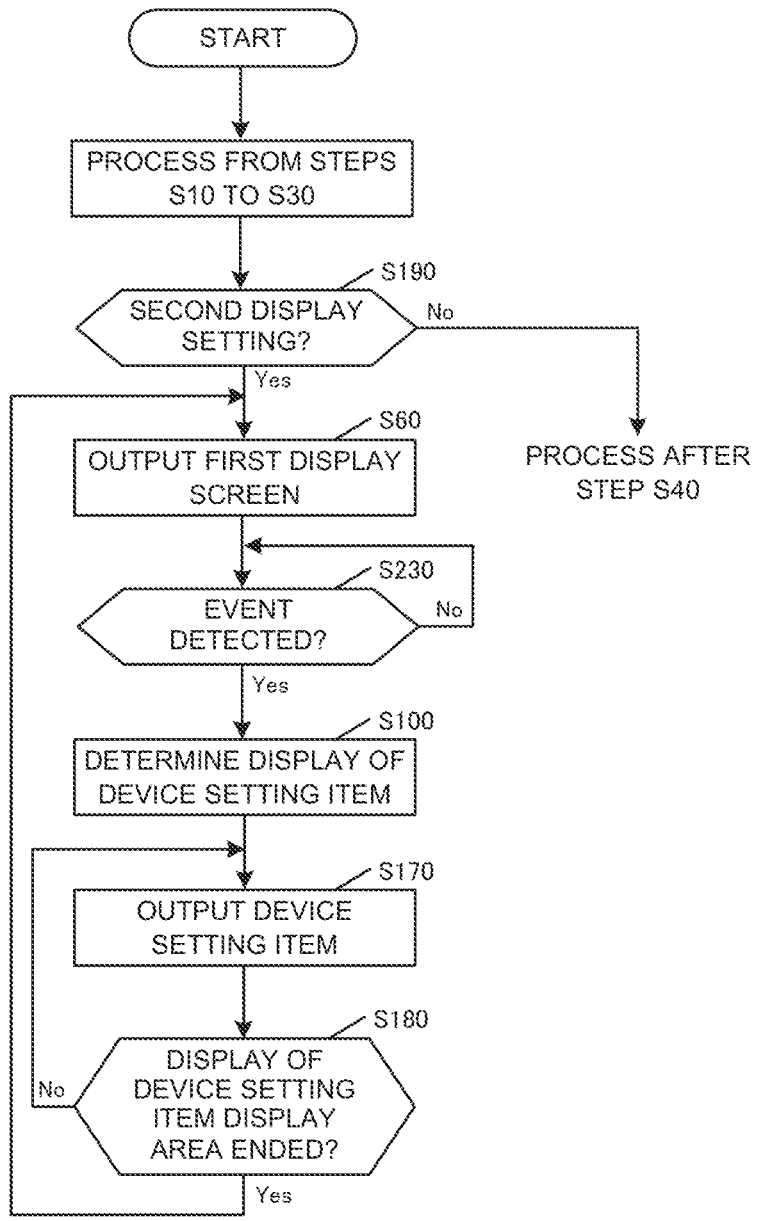
FIG. 14 is a flowchart illustrating a process flow according to a fifth embodiment.

Next, a process flow according to the fifth embodiment will be described using the flowchart in FIG. 14. The process before Step S190 in FIG. 14 may be the same as the process from Steps S10 to S30 in FIG. 4 according to the first embodiment. Therefore, different processes after Step S190 will be described here. The part with the same process as that described in FIG. 4, 7, 10, 12, or the like, may be denoted by the same reference mark, and the description thereof may be omitted.

After the process from Steps S10 to S30 is performed, the controller 11 determines whether the display setting is the second display setting (Step S190).

When it is determined that the display setting is the second display setting, the controller 11 outputs only the home screen (Step S190; Yes→Step S60). Conversely, when it is determined that the display setting is the first display setting, the controller 11 may perform the process after Step S40 in FIG. 4 (Step S190; No→"process after Step S40").

Subsequently, the controller 11 determines whether an event related to the device setting item has been detected (Step S230). Events related to the device setting item are not particularly limited, but examples thereof may include the case where the remaining amount of toner is low or the case where the number of pieces of paper used approaches a device limit value.

When it is determined that an event related to the device setting item has been detected, the controller 11 determines the display of the device setting item (Step S230; Yes→Step S100). When no event related to the device setting item has been detected, the detection operation is continuously performed until an event is detected (Step S230; No).

Then, the controller 11 outputs the device setting item based on a determination result at Step S100. Here, as the screen configuration of the display screen, a device setting item display area may be provided on a portion of the screen area of the home screen, or the device setting item display area may be displayed on the screen area of the home screen in a superimposed manner (Step S170). When an event is detected, the screen may be shifted to the function setting screen (the second display screen) for the event, and then the device setting item may be output.

The controller 11 continuously displays the device setting item display area until a display end instruction for the device setting item display area is input (Step S180; No→S- tep S170). Conversely, when a display end instruction for the device setting item display area is input, the controller 11 ends the display of the device setting item display area and returns the process to Step S60 (Step S180; Yes→Step S60).

5.3 Operation Example

Figure 15A:
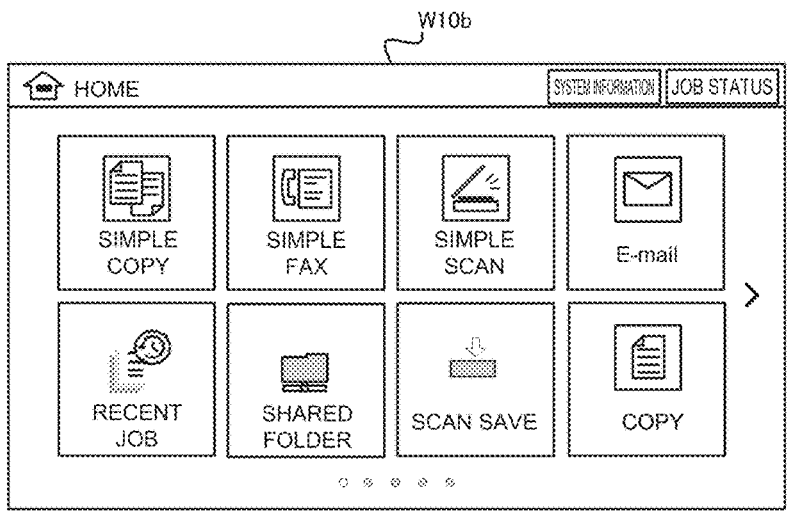
FIGS. 15A to 15C are diagrams illustrating an operation example according to the fifth embodiment.
Figure 15B:
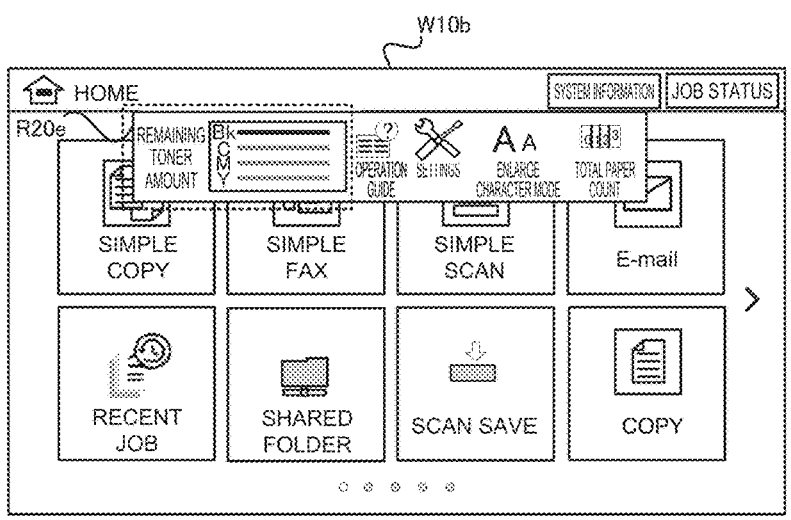
Figure 15C:
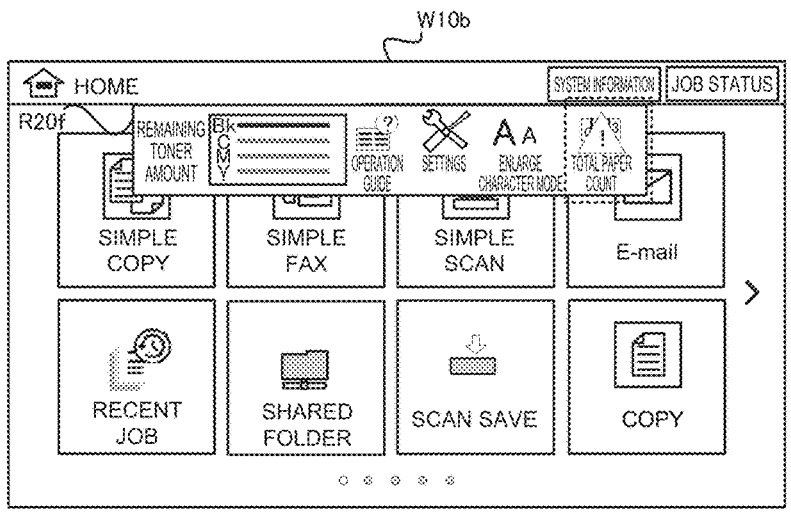

Next, an operation example according to the fifth embodiment will be described. FIGS. 15A to 15C are diagrams illustrating an operation example where, in the second display setting where the display setting of the device setting item on the home screen is set to hiding, the display of the device setting item is determined when an event related to the device setting item occurs.

FIG. 15A is a diagram illustrating one configuration of the home screen W10b in the second display setting. The home screen W10b may have the same configuration as that of the home screen W10b illustrated in FIG. 6A, and therefore the same reference marks are used here and the description thereof is omitted.

FIG. 15B illustrates a display example of a device setting item display area R20e that is displayed by the controller 11 on the home screen W10b in a superimposed manner when the case where the remaining amount of toner is low is detected as an event on the home screen W10b illustrated in FIG. 15A.

FIG. 15C illustrates a display example of a device setting item display area R20f that is displayed by the controller 11 on the home screen W10b in a superimposed manner when the case where the number of pieces of paper used approaches the device limit value is detected as an event on the home screen W10b illustrated in FIG. 15A.

In the description of the fifth embodiment, the home screen is described as an example of the display screen where the device setting item display area R20e or R20f is displayed when the event occurs, but the device setting item display area R20e or R20f may also be displayed on the second display screen, or the like, described according to the first embodiment to the fourth embodiment. In this case, for example, after the process to output the second display screen at Step S110 in FIG. 12, the process to detect the event after Step S230 in FIG. 14 may be performed.

As described above, the fifth embodiment is an embodiment where, in the second display setting where the display setting of the device setting item on the home screen is set to hiding, the device setting item is displayed when the event related to the device setting item occurs so that the user may concentrate on the operation for image processing without consciously paying attention to the operation for the display of the device setting item.

The present disclosure is not limited to each of the above-described embodiments, and various modifications may be made. In other words, the technical scope of the present disclosure also includes embodiments obtained by combining technical measures modified as appropriate without departing from the scope of the present disclosure.

Further, some parts of the above-described embodiments are separately described for convenience of explanation but may be obviously implemented in combination within a technically allowable range.

The program operated on each device according to the embodiment is a program that controls the CPU, or the like (a program that causes a computer to function) so as to perform the functions according to the above-described embodiment. The information handled in the devices is temporarily accumulated in a temporary storage device (e.g., RAM) during the processing, then stored in various storage devices such as a read only memory (ROM) and an HDD, and read, corrected, and written by the CPU as necessary.

Here, a recording medium that stores the program may be any of a semiconductor medium (e.g., a ROM or a non-volatile memory card), an optical recording medium/magneto optical recording medium (e.g., a digital versatile disc (DVD), a magneto optical disc (MO), MiniDisc (MD), a compact disc (CD), or a Blu-ray (registered trademark) disc (BD)), and a magnetic recording medium (e.g., a magnetic tape or a flexible disk), and the like. In addition to execution of the function according to the above-described embodiment by executing a loaded program, the function according to the present disclosure may be performed by processing based on an instruction of the program in collaboration with an operating system or other application programs.

For distribution in the market, the program may be stored and distributed in a portable recording medium or transferred to a server computer connected via a network such as the Internet. In this case, it is obvious that the present disclosure also includes a storage device of the server computer.

What is claimed is:

1. A display device comprising:
a display capable of displaying a first display screen, a second display screen different from the first display screen, and a device setting item displayed together with the first display screen or the second display screen; and
a controller that controls a screen display on the display, wherein
the controller
determines a display of a shortcut icon for receiving a display instruction for the device setting item on the second display screen when a display setting of the device setting item on the first display screen is set and determines hiding of the shortcut icon on the second display screen when a hiding setting of the device setting item on the first display screen is set,
displays the device setting item on the second display screen when the shortcut icon is selected on the second display screen,
displays the shortcut icon after the selection differs from the shortcut icon before the selection in a different display mode, and
restricts, with regard to the device setting item to be displayed on the first display screen, the display of the device setting item that is not related to a function pertaining to the second display screen on the second display screen.

2. The display device according to claim 1, wherein the controller displays the device setting item in an occupation area that occupies a portion of the first display screen or the second display screen.

3. The display device according to claim 1, wherein when the display setting of the device setting item on the first display screen is set, the controller further determines hiding of the device setting item on the second display screen.

4. The display device according to claim 1, wherein the controller changes the device setting item to be displayed on the second display screen in accordance with the second display screen.

5. The display device according to claim 1, wherein when the hiding setting of the device setting item on the first display screen is set, the controller determines a display of the device setting item on the first display screen in addition to the second display screen.

6. The display device according to claim 5, wherein the controller determines whether the display setting or the hiding setting of the device setting item is set based on a detection result of a gesture operation via the first display screen or the second display screen.

7. The display device according to claim 6, wherein the gesture operation comprises a swipe operation for moving a touch position from a starting point on the first display screen and the second display screen.

8. The display device according to claim 5, wherein the controller determines whether the display setting or the hiding setting of the device setting item is set based on a selection result of the shortcut icon for displaying the device setting item on the first display screen or the second display screen.

9. The display device according to claim 5, wherein the controller determines whether the display setting or the hiding setting of the device setting item is set based on presence or absence of occurrence of an event related to the device setting item.

10. An image processing apparatus comprising:
the display device according to claim 1; and
an image processor that performs image processing based on a display content displayed on the first display screen or the second display screen.

11. The display device according to claim 1, wherein the controller displays the device setting item on a screen area of the second display screen in a superimposed manner.

12. A display screen display method comprising:
displaying a first display screen, a second display screen different from the first display screen, and a device setting item to be displayed together with the first display screen or the second display screen; and
controlling a screen display at the displaying, wherein the controlling
determines a display of a shortcut icon for receiving a display instruction for the device setting item on the second display screen when a display setting of the device setting item on the first display screen is set and determines hiding of the shortcut icon on the second display screen when a hiding setting of the device setting item on the first display screen is set,
displays the device setting item on the second display screen when the shortcut icon is selected on the second display screen,
displays the shortcut icon after the selection differs from the shortcut icon before the selection in a different display mode, and
restricts, with regard to the device setting item to be displayed on the first display screen, a display of the device setting item that is not related to a function pertaining to the second display screen on the second display screen.

* * * * *